US008910163B1

(12) United States Patent
Grechishkin et al.

(10) Patent No.: US 8,910,163 B1
(45) Date of Patent: *Dec. 9, 2014

(54) SEAMLESS MIGRATION OF NON-NATIVE APPLICATION INTO A VIRTUAL MACHINE

(71) Applicant: Parallels IP Holdings GmbH, Schaffhausen (CH)

(72) Inventors: Alexander V. Grechishkin, Moscow (RU); Alexey B. Koryakin, Moscow (RU); Nikolay N. Dobrovolskiy, Moscow (RU); Andrey A. Omelyanchuk, Moscow (RU); Alexander G. Tormasov, Moscow (RU); Serguei M. Beloussov, Singapore (SG)

(73) Assignee: Parallels IP Holdings GmbH, Schaffhausen (CH)

( * ) Notice: Subject to any disclaimer, the term of this patent is extended or adjusted under 35 U.S.C. 154(b) by 139 days.

This patent is subject to a terminal disclaimer.

(21) Appl. No.: 13/776,829

(22) Filed: Feb. 26, 2013

Related U.S. Application Data

(63) Continuation of application No. 12/773,224, filed on May 4, 2010, now Pat. No. 8,387,048, which is a continuation-in-part of application No. 11/739,131, filed on Apr. 24, 2007, now Pat. No. 7,987,432.

(60) Provisional application No. 61/175,088, filed on May 4, 2009, provisional application No. 60/823,988, filed on Aug. 30, 2006, provisional application No. 60/745,532, filed on Apr. 25, 2006.

(51) Int. Cl.
*G06F 9/455* (2006.01)

(52) U.S. Cl.
CPC .................................. *G06F 9/45533* (2013.01)
USPC ............................................................ 718/1

(58) Field of Classification Search
None
See application file for complete search history.

(56) References Cited

U.S. PATENT DOCUMENTS

| | | | |
|---|---|---|---|
| 5,202,828 | A | 4/1993 | Vertelney et al. |
| 6,397,242 | B1 | 5/2002 | Devine et al. |
| 6,421,738 | B1 | 7/2002 | Ratan et al. |
| 6,496,847 | B1 | 12/2002 | Bugnion et al. |
| 6,704,925 | B1 | 3/2004 | Bugnion |
| 6,711,672 | B1 | 3/2004 | Agesen |
| 6,725,289 | B1 | 4/2004 | Waldspurger et al. |
| 6,735,601 | B1 | 5/2004 | Subrahmanyam |
| 6,785,886 | B1 | 8/2004 | Lim et al. |
| 6,789,156 | B1 | 9/2004 | Waldspurger |

(Continued)

OTHER PUBLICATIONS http://www.codeweavers.com/products/mac (2007).

(Continued)

*Primary Examiner* — Gregory A Kessler
(74) *Attorney, Agent, or Firm* — Bardmesser Law Group

(57) ABSTRACT

A method, system and computer program product for implementing a first Virtual Machine (VM) and a first guest OS in the VM, on a computing system that has a host OS and a host desktop. The first VM has a non-native application associated with the first VM and the first guest OS; means for replacing the first guest OS in the first VM with a different guest OS; a second VM and a second guest OS in the second VM running on the processor; upon a user attempting to launch the non-native application, means for associating the non-native application with the second VM; and means for determining compatibility of the non-native application with the second guest OS; The non-native application is launched inside the second VM.

19 Claims, 20 Drawing Sheets

(56) References Cited

U.S. PATENT DOCUMENTS

| | | |
|---|---|---|
| 6,795,966 B1 | 9/2004 | Lim et al. |
| 6,880,022 B1 | 4/2005 | Waldspurger et al. |
| 6,944,699 B1 | 9/2005 | Bugnion et al. |
| 6,961,806 B1 | 11/2005 | Agesen et al. |
| 6,961,941 B1 | 11/2005 | Nelson et al. |
| 7,069,413 B1 | 6/2006 | Agesen et al. |
| 7,082,598 B1 | 7/2006 | Le et al. |
| 7,089,377 B1 | 8/2006 | Chen |
| 7,111,086 B1 | 9/2006 | Ecoleston et al. |
| 7,111,145 B1 | 9/2006 | Chen et al. |
| 7,117,481 B1 | 10/2006 | Agesen et al. |
| 7,149,843 B1 | 12/2006 | Agesen et al. |
| 7,155,558 B1 | 12/2006 | Vaghani et al. |
| 7,222,221 B1 | 5/2007 | Agesen et al. |
| 7,260,815 B1 | 8/2007 | Chen et al. |
| 7,721,299 B2 | 5/2010 | van Riel |
| 2002/0013892 A1 | 1/2002 | Gorishek et al. |
| 2002/0059054 A1 | 5/2002 | Bade et al. |
| 2002/0078260 A1 | 6/2002 | Hart et al. |
| 2005/0091310 A1 | 4/2005 | Salomon |
| 2006/0005187 A1 | 1/2006 | Neil |
| 2006/0010433 A1 | 1/2006 | Neil |
| 2006/0070066 A1 | 3/2006 | Grobman |
| 2006/0136912 A1 | 6/2006 | Robinson et al. |
| 2006/0227141 A1 | 10/2006 | Hogle |
| 2006/0230156 A1 | 10/2006 | Shappir et al. |
| 2006/0265711 A1 | 11/2006 | Bantz et al. |
| 2006/0277481 A1 | 12/2006 | Forstall et al. |
| 2007/0043860 A1 | 2/2007 | Pabari |
| 2007/0067769 A1 | 3/2007 | Geisinger |
| 2007/0101323 A1 | 5/2007 | Foley et al. |
| 2007/0169112 A1 | 7/2007 | Wu et al. |
| 2007/0204153 A1 | 8/2007 | Tome et al. |

OTHER PUBLICATIONS

Collins, David, "Using Vmware and Live CD's to Configure a Secure, Flexible, Easy to manage Computer Lab Environment", Apr. 4, 2006, Consortium for Computing Sciences in Colleges, Abstract.

US 8,910,163 B1

SEAMLESS MIGRATION OF NON-NATIVE APPLICATION INTO A VIRTUAL MACHINE

CROSS-REFERENCE TO RELATED APPLICATIONS

This application is a continuation of U.S. patent application Ser. No. 12/773,224, filed on May 4, 2010, which is a non-provisional of U.S. Patent Application No. 61/175,088, filed on May 4, 2010, entitled SEAMLESS INTEGRATION, MIGRATION AND INSTALLATION OF NON-NATIVE APPLICATION INTO NATIVE OPERATING SYSTEM, which is incorporated by reference herein in their entirety.

U.S. patent application Ser. No. 12/773,224, filed on May 4, 2010 is a continuation-in-part of U.S. patent application Ser. No. 11/739,131, filed on Apr. 24, 2007, entitled SEAMLESS INTEGRATION AND INSTALLATION OF NON-NATIVE APPLICATION INTO NATIVE OPERATING SYSTEM, which is a non-provisional of U.S. Provisional Patent Application No. 60/823,988; Filed: Aug. 30, 2006, entitled SEAMLESS INTEGRATION AND INSTALLATION OF NON-NATIVE APPLICATION INTO NATIVE OPERATING SYSTEM, and is a non-provisional of U.S. Provisional Patent Application No. 60/745,532; Filed: Apr. 25, 2006, entitled SEAMLESS INTEGRATION OF NON-NATIVE APPLICATION INTO NATIVE OPERATING SYSTEM, which are all incorporated by reference herein in their entirety.

BACKGROUND OF THE INVENTION

1. Field of the Invention

This invention relates to a method, system and computer program product for integrating application software written for one operating system into other operating system environments.

2. Description of the Related Art

One of the features that today many computer users desire to have is interoperability between applications written for different operating systems. For example, the Apple Macintosh computer and its graphical user interface, browser and operating system have a loyal following in the marketplace. At the same time, Apple Computer, Inc.'s market share is approximately 3-5% of the overall desktop and laptop computer market. As a result, the number of software titles that are written for the Microsoft Windows™ platform (which is approximately 90% of the market today) is vastly greater than the number of software titles written for the Apple Macintosh. Nonetheless, many Apple Macintosh users would like to be able to run Windows™ applications on their Macintosh's, and to do it as "seamlessly" as possible.

Accordingly, there is a need in the art for a system and method for seamless integration of non-native operating system applications into native operating system environments.

SUMMARY OF THE INVENTION

Accordingly, the present invention is related to a system, method and computer program product for seamless integration of non-native applications into a host OS that substantially obviates one or more of the disadvantages of the related art.

In one aspect, there is provided a method, system and computer program product migrating non-native applications include launching a first Virtual Machine (VM) and a first original guest OS in the VM, on a computing system that has the host OS and a host desktop, wherein the first VM has a non-native application associated with the first VM and the first original guest OS; replacing the first original guest operating system (OS) system in the first VM with a different version of the guest OS; upon a user attempting to launch the non-native application, migrating the non-native application in the first VM to the second VM; launching a second Virtual Machine (VM) and a second original guest OS in the VM, on the computing system; associating the non-native application with the second VM; launching the non-native application inside the second VM; and displaying a non-native application window to the user.

In another aspect, there is provided a method, system and computer program product recorded on a computer-readable medium for execution on at least one processor, for seamless integration of a non-native application into a host OS, including launching a first Virtual Execution Environment (VEE) on a computing system that has a host operating system and a host desktop; displaying a window corresponding to the first VEE on the host desktop; installing a second VEE that is compatible with a user application; installing the user application into the second VEE; upon a user invoking the user application, launching the user application inside the second VEE; and displaying at least part of a window of the user application within a desktop window of the second VEE.

As various options, the window of the user application window is fully displayed, or only partially displayed. The second VEE is any of a Virtual Private Server, a Virtual Machine, a Hypervisor-based Virtual Machine, a Lightweight Hypervisor-based Virtual Machine, a VMM-based Virtual Machine, a Hypervisor-based VM with hardware virtualization support, a Hypervisor-based VM without hardware virtualization support, a Hypervisor-based VM with security support, a Hypervisor-based VM without security support, a Virtuozzo™-type Virtual Private Server, a Sun Microsystems™ container-based environment, an HPUX internal container environments, and a jail-based environments. The first VEE is any of a session of Terminal Server Windows 2003 (or older) and a session of Citrix Presentation Server.

The second VEE is installed and launched on the same computer as the first VEE, or the second VEE is installed and launched on a remote machine and its output is shown on a client computer, or the second VEE is installed and launched on a remote computer cluster. The second VEE window is partially invisible, except for a window showing the user application, or the second VEE window is made invisible automatically upon startup of the non-native application, except for a window showing the user application. The file system of the second VEE is seamlessly integrated into the file system of the host operating system and the first VEE. The user can drag-and-drop objects from within the first VEE window to the user application. The user can drag-and-drop objects from within the user application to the first VEE window. The user invokes the user application by using autorun media, where autorun media contains the user application and/or where the autorun media contains a snapshot of the second VEE. The user application can also be invoked by using autoplay media.

As yet further options, the VEE desktop can be unhidden in response to the user's request and the window of the user application placed inside the window corresponding to the VEE. An icon of the window corresponding to the first VEE is placed on the host desktop. The host desktop is Windows desktop and the icon is placed on the taskbar. Stubs to user application are placed in the host OS with for handling stubs using icons through host OS. The host desktop is a Mac OS desktop and the icon is placed on the Mac OS Dock Bar. A full screen toggling images of the host desktop and the second VEE desktop can be done in response to a user request. The window corresponding to the VEE stays visible after toggling. The toggling is performed using 3D animation of the desktops images. The user application installation includes driver installation and/or configuration of the user application. The host OS and the first VEE support transparent copy/paste operations between the host desktop and the first VEE desktop, and transparent copy/paste operations between the host applications and the user application. The user application can operate with a file system of the host OS as if the file system of the host OS were part of the first VEE's file system. Security rules related to data transmission between the host OS and the VEE and access rules from host OS to VEE and/or from VEE to host OS are implemented. Sets of security rules and/or access rules corresponding to different levels of security can be implemented, with the sets of security rules being changed using configuration application representing slider image on the host desktop or on the window related to VEE. The first VEE and the host OS share at least some file system folders. Groups of objects can include, for example, part of the file system of the host OS, part of the file system of the first VEE desktop, My Documents for Microsoft Windows™, My Pictures for Microsoft Windows™ My Videos for Microsoft Windows™, User Home Directory for both Microsoft Windows™ and Mac OS, Program Files for Microsoft Windows™, Applications for Mac OS, Movies for Mac OS, and Pictures for Mac OS.

The second VEE's desktop can be hidden so that the user application occupies the entire window corresponding to the second VEE, or hidden partially, and at least some second VEE graphical user interface (GUI) elements are visible. The elements include, for example, a "Start" Menu for Microsoft Windows™ and Mac OS Dock Bar.

As yet a further option, a Virtual Machine (VM) can be running as the second VEE; a window/application in the first VEE is associated with the VM; a visual element represented corresponding window/application associated with the VM in a graphical user interface of the first VEE; and a pop up (context) menu associated with the visual element. Some GUI elements hidden in the second VEE are shown in the pop up menu. The graphical user interface comprises any of window/application list in Microsoft Windows™ Task Bar, and an application list in Mac OS Dock Bar.

The first VEE has links to at least one user application of the second VEE. Dragging documents to the user application links leads to starting corresponding user application. Multiple user applications can be launched in the second VEE. The first VEE has a utility association in a context menu. The context menu is, for example, "Send to mail recipient" in Microsoft Windows, "Send to compressed folder" in Microsoft Windows™ and "Create archive" in Mac OS. Thus, the user can have "Send to mail recepient" context menu item (in the first VEE). The association is changed to the linked user application from the second VEE. In the case of the first VEE being a Mac OS, and the second VEE being Microsoft Windows, the user will mail documents through the context menu via Outlook in Windows. A reverse scenario is also possible: mailing a document in the second VEE and as a result it will actually be mailed through the Apple Mail.

As yet a further option, files are associated with the user application by using a link and based on file type. The user application can be invoked using the user request to open the file having the appropriate file type. The file type is associated with a host utility, which is started when the user requests to open the file having the file type. The host utility launches the user application and delivers data and settings to the user application that are required for handling the file by the user application. As a further option, a single host utility is associated with more than one file type, and the host utility detects the user application required for handling of the file, launches the user application and delivers the data and the settings to the user application. An icon corresponding to the user application is placed on the host desktop. The user chooses the icon, a host utility is started that launches the user application. Multiple icons corresponding to different non-native user applications are placed on the host desktop and wherein the host utility is started when user chooses any of the icons. The host utility launches any of the user applications corresponding to the selected icon.

In another aspect, a method for integration of a non-native document into a host OS, includes launching a first Virtual Execution Environment (VEE) on a computing system that has a host operating system and a host desktop; displaying a window corresponding to the first VEE on the host desktop; installing an application into the first VEE that is compatible with the document; installing a second VEE that is incompatible with the document but contains the document; associating the document with the first VEE; upon a user invoking the document, launching the application inside the first VEE, and opening the document that is located in the second VEE by using the application.

The second VEE is installed and launched on the same computer as the first VEE, or on a remote machine, or on a remote computer cluster. The second VEE window is partially or entirely invisible, except for a window showing the user application, and/or second VEE window is made invisible automatically upon startup of the non-native application, except for a window showing the user application. The file system of the second VEE is seamlessly integrated into the file system of the host operating system and the first VEE. The user can drag-and-drop objects from within the first VEE window to the user application, or the user can drag-and-drop objects from within the user application to the first VEE window.

In another aspect, there is provided a method, system and computer program product for seamless integration of a non-native application into a user's operating system (OS), including launching a first Virtual Execution Environment (VEE) on a computing system that has the user's OS and the user's OS desktop being displayed to a user; displaying a window corresponding to the VEE and a guest OS of the VEE on the user's OS desktop; upon a user invoking an application that is non-native to the user's OS, (a) installing the application into the first VEE, (b) launching the application inside the first VEE, and (c) making the window invisible, except for a portion of the window occupied by the application. The user's OS desktop can be provided with an icon for starting the application in the first VEE. The icon corresponds to a file whose extension is associated with the application, or a direct link to the application, or a hardware device supported by the application. The file system of the second VEE can be seamlessly integrated into the file system of the user's operating system. The portion of the window occupied by the application can have a complex or an irregular shape.

In another aspect, there is provided a system for seamless integration of a non-native applications into a host OS, including a plurality of Virtual Machines running on a computing system that has a host operating system and a host desktop displayed to a user. Each Virtual Machine has a guest operating system running within it, and each Virtual Machine has a corresponding window on the host desktop, the window displaying a desktop of the guest operating system. Each Virtual Machine is running a user application that is non-native to both the host OS and other Virtual Machines. The user applications can exchange objects with applications in other Virtual Machines and in the host OS through drag-and-drop commands by the user.

In another aspect, there is provided a system for seamless integration of a non-native applications into a host OS, including a plurality of Virtual Machines running on a computing system that has the host OS and has a host desktop displayed to a user. Each Virtual Machine has a guest operating system running within it. Each Virtual Machine running a user application that is non-native to both the host OS and other Virtual Machines. Each user application has a window displayed on the host desktop that is integrated into the host desktop to use a graphical interface of the host desktop.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Reference will now be made in detail to the preferred embodiments of the present invention, examples of which are illustrated in the accompanying drawings.

The following definitions are generally used throughout this description:

VEE—Virtual Execution Environment—a type of environment that supports program code execution, where at least a part of the hardware and software required for running program code are presented as their virtual analogs. Virtual analogs, such as virtual storage, refers to storage that is virtualized as part of real storage (HDD, partition, file or Flash drive, etc.), "virtual memory" refers to memory that is virtualized as part of real physical memory, swappable memory mapped file, etc. VEE generally implies a coexistence of a host operating system and a "foreign" execution environment in the host operating system simultaneously. From the point of view or the user, the code in the VEE runs as if it were running on the real computing system.

VM—a type of an isolated Virtual Execution Environments running on the same physical machine simultaneously. Each Virtual Machine instance executes its own OS kernel. Support of Virtual Machines is implemented using a Virtual Machine Monitor and/or a Hypervisor.

Hypervisor—control software having the highest privilege level for administrating hardware computer resources and Virtual Machines, see discussion in U.S. patent application Ser. No. 11/348,382; Filed: Feb. 7, 2006, entitled SYSTEM AND METHOD FOR STARTING VIRTUAL MACHINE MONITOR IN COMMON WITH ALREADY INSTALLED OPERATING SYSTEM, incorporated herein by reference in its entirety.

Virtual storage—block-level storage space that may be regarded by the user of a computer system as addressable hardware storage, or a storage partition, using virtual addresses, that are utilized during virtual disk input/output operations as physical addresses.

Disk image—a file or a consistent set of files that represents content of a disk storage or of a partition corresponding to virtual storage on a block level.

Virtual disk driver—an OS driver that enables other programs to interact with a virtual hardware device. The virtual disk driver may be implemented as a special driver or may be implemented by adding, to the standard hardware driver, additional functionality, for example, filtering or redirecting ability. The disk image and virtual disk driver may be used by the VEEs of the present invention as one possible implementation.

Figure 9:
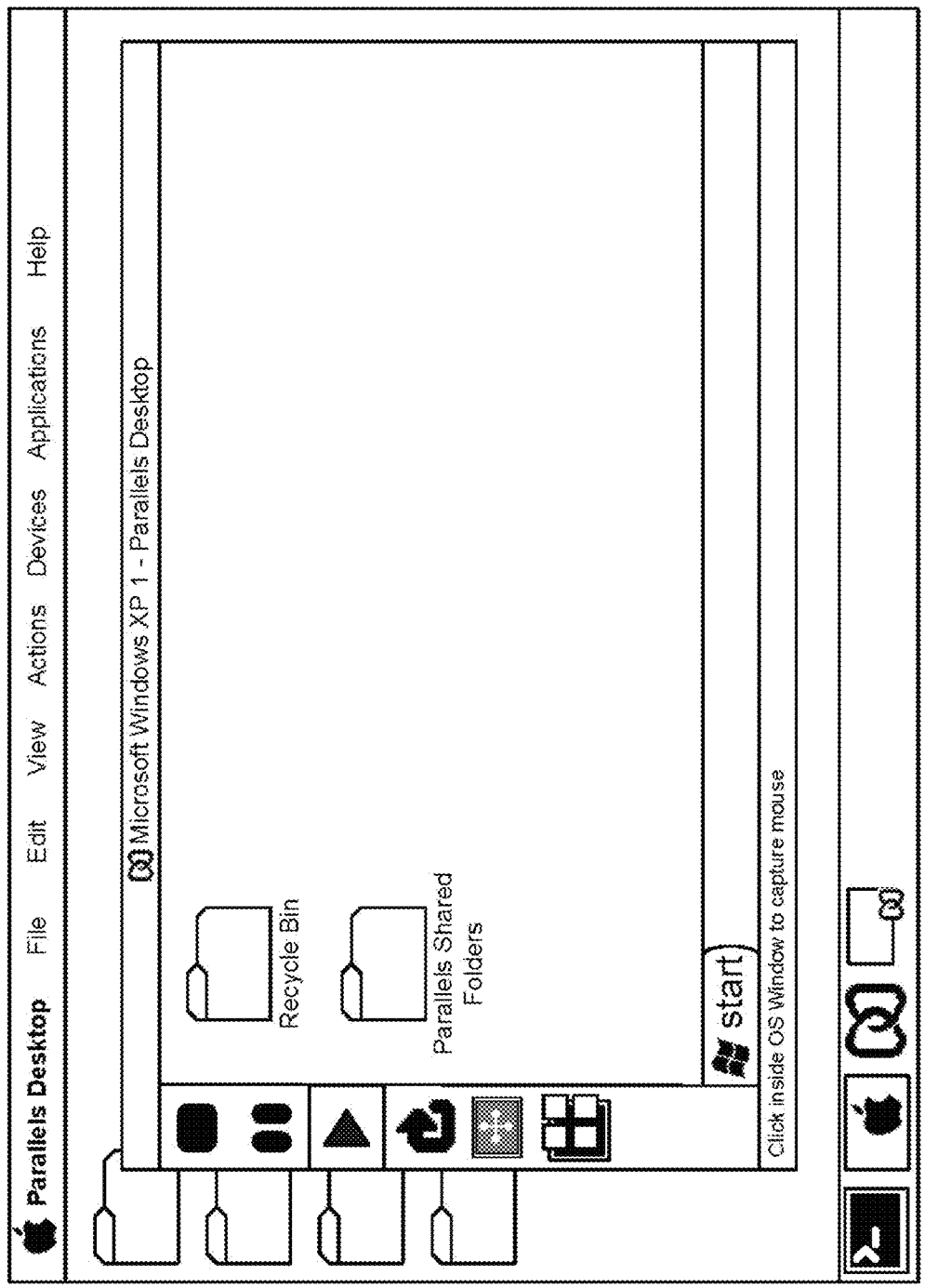
FIGS. 9-18 illustrate how Virtual Machines and non-native applications can be integrated into the Mac OS.
Figure 16:
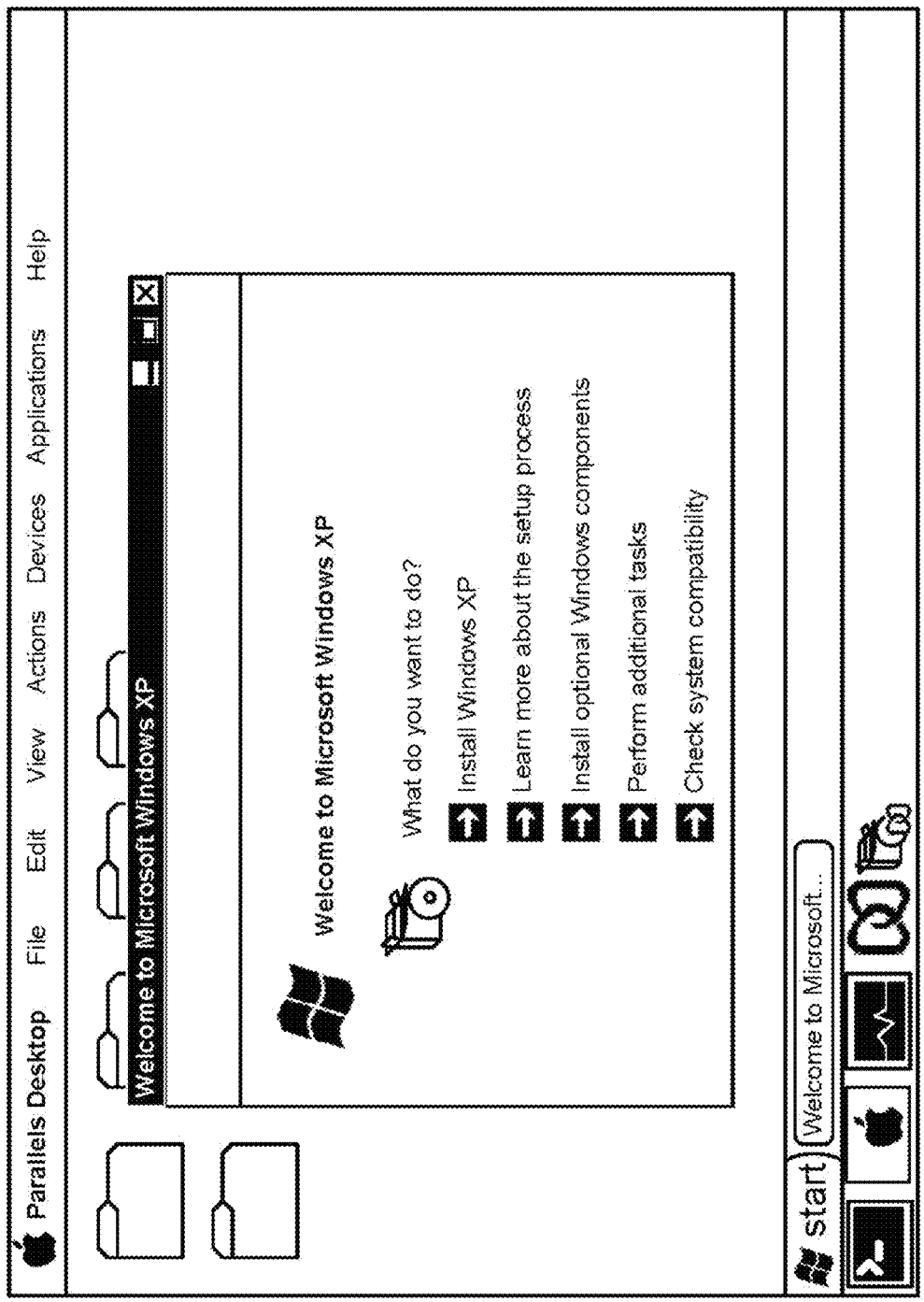
Figure 17:
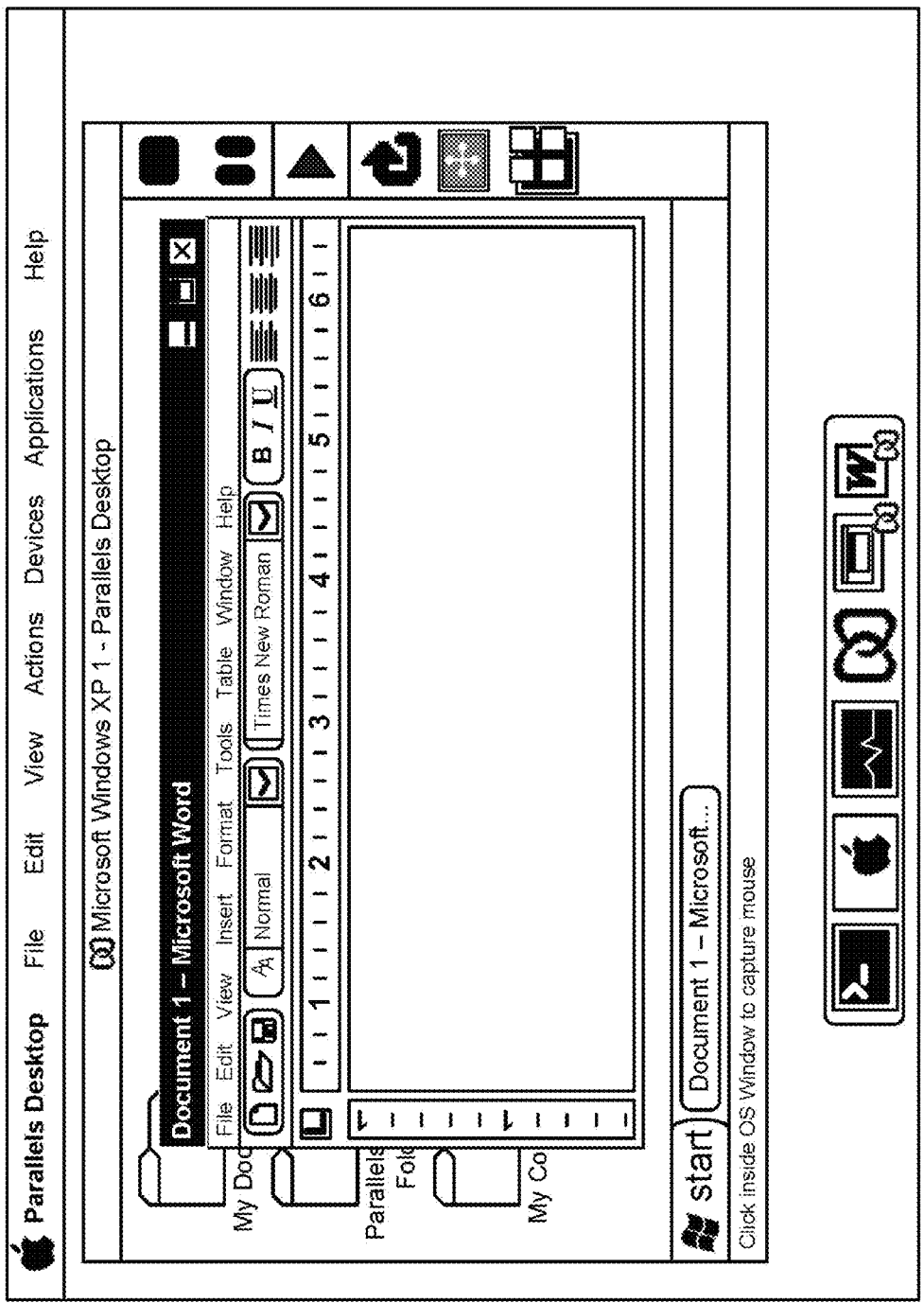
Figure 18:
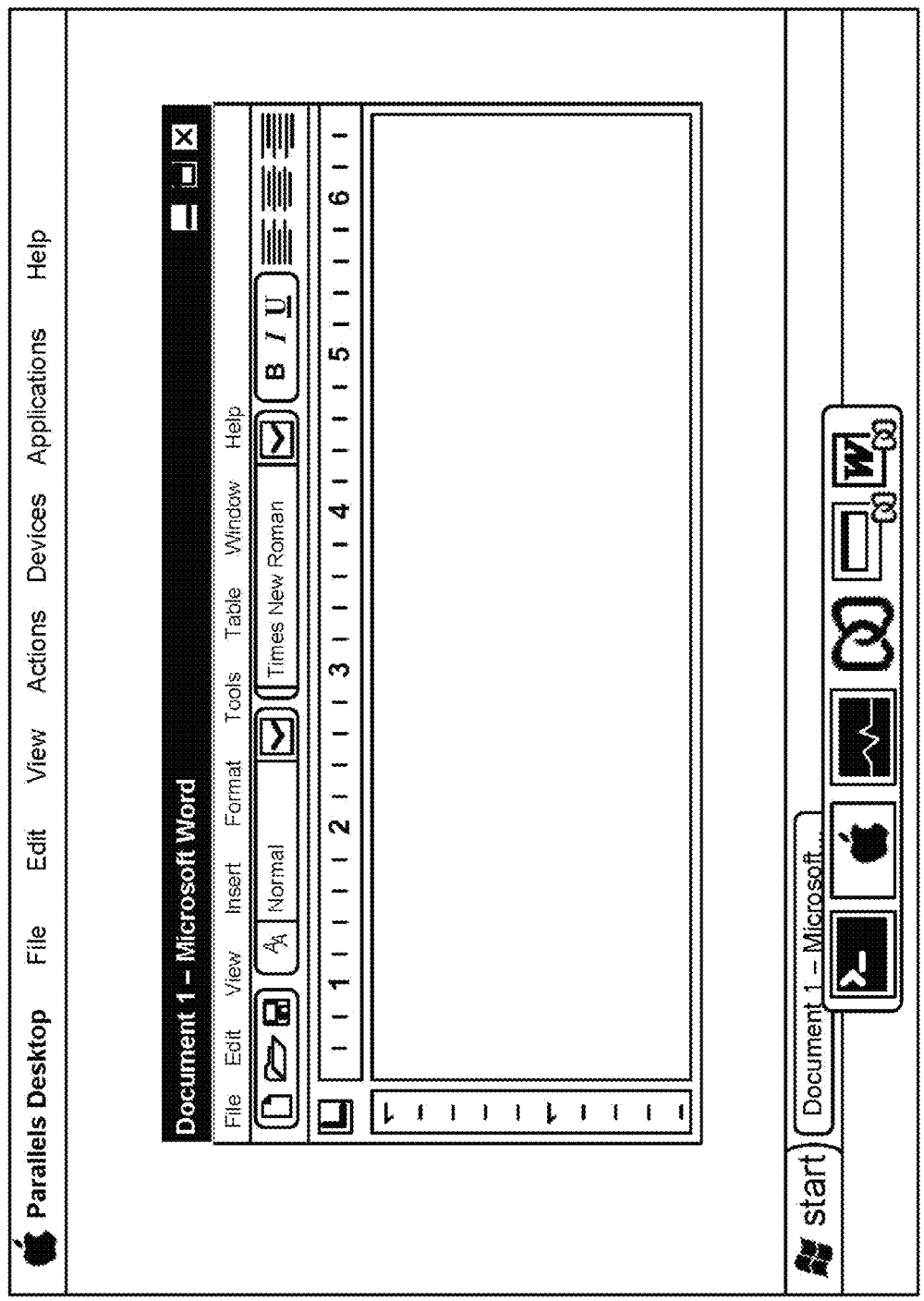

One embodiment of the present invention involves the launching of a Virtual Execution Environment, such as a Virtual Machine, see FIG. 16, within which another user application is running. For purposes of illustration, the computer at issue is an Apple Macintosh computer, running Apple's Mac OS operating system, with the usual Apple Computer/Mac OS "look and feel," desktop, dock bar at the bottom of the screen, etc. A user would like to launch a Windows™ application, for example, Microsoft Word for Windows™. To do so, a Virtual Machine is launched, such that a window appears on the desktop screen. Within that window is the Windows™ desktop, for example, showing the usual Windows™ icons, the Start button, the toolbar, menu bar, system tray, etc. That Windows™ (e.g., XP, Vista, Windows 7 or successors) desktop is therefore part of a guest operating system, while Apple's OS/X or Mac OS (for example) is the host operating system (in this example), see schematic in FIG. 1 and in FIG. 9. Then the user can launch Microsoft Word inside the guest operating system and the user will see MS Word window on/over the guest OS desktop, see FIGS. 17-18.

Some examples of the user applications are: system administrator shells, system spreadsheets, web browsers, games, text editors, network tools, desk managers, databases, graphics/image browsers and editors, file managers, word processors, mail programs, multimedia tools, language tools, daemons, servers, including system services, daemons, and similar constructs typically utilized by the user's database software, webpage servers, remote procedure calls, support daemons, Telnet servers, backup utilities, development tools, device drivers, printer utilities, emulators, firewalls, antivirus software, anti-spam software, anti-adware software, intrusion detection systems, various other forms of security-related and anti-malware software, and so on.

Figure 1:
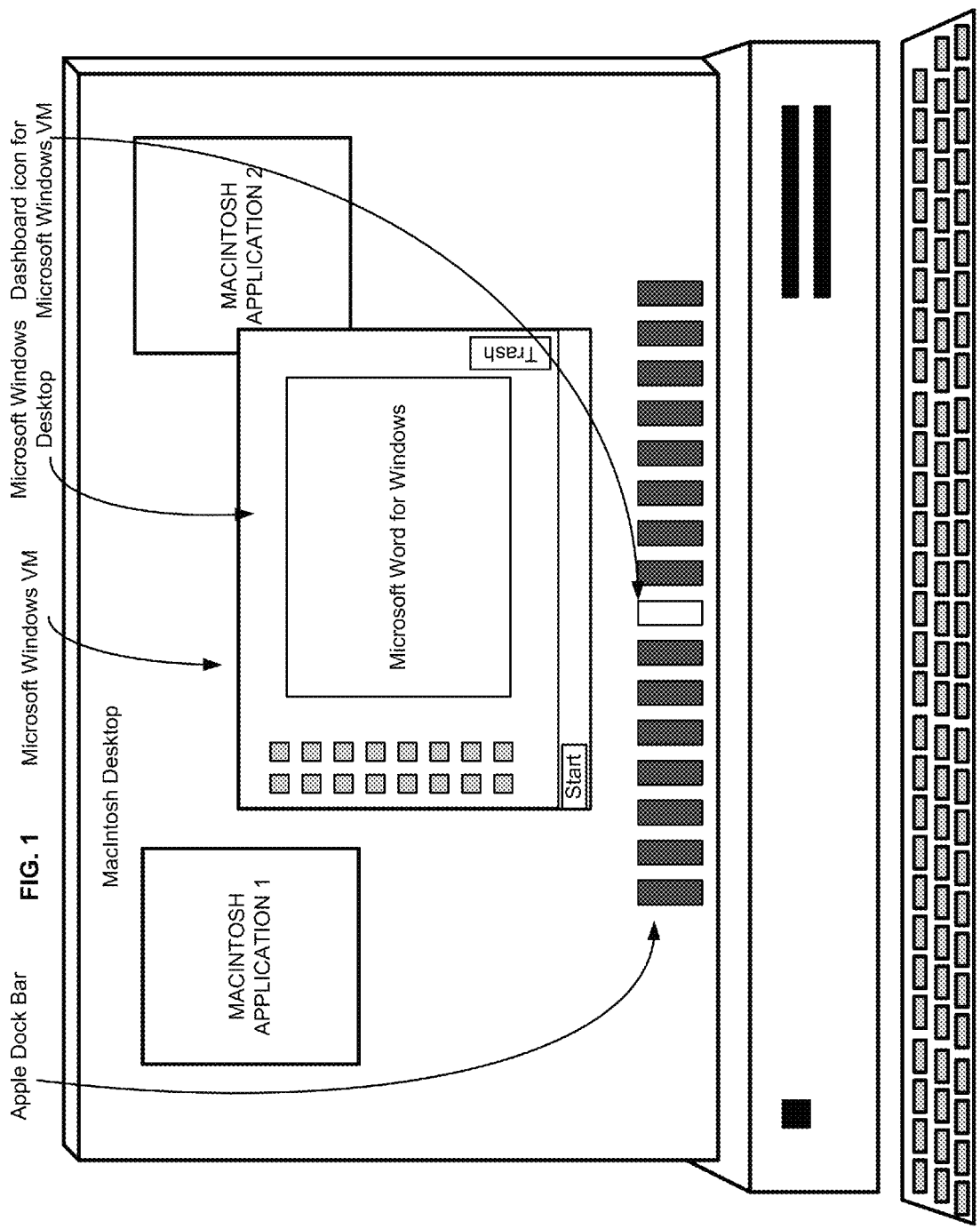
FIGS. 1-7 illustrate various exemplary embodiments of the invention in the context of the Apple Macintosh desktop.

With the Windows™ operating system as the guest OS now running inside the Virtual Machine, and the desktop and other facilities and utilities of Windows™ now available within that window as a separate window in the Macintosh desktop, a user can launch the Windows™ application that he desires, in this example, Microsoft Word for Windows™, see FIG. 1. The Microsoft Word for Windows™ application will open a window inside the Microsoft Windows™ desktop (in other words, a window within a window). As would be familiar to users of Microsoft Windows™, the Microsoft Word window can occupy either the entire screen, with only the task bar at the bottom visible, or can be a smaller window within the desktop window.

Figure 2:
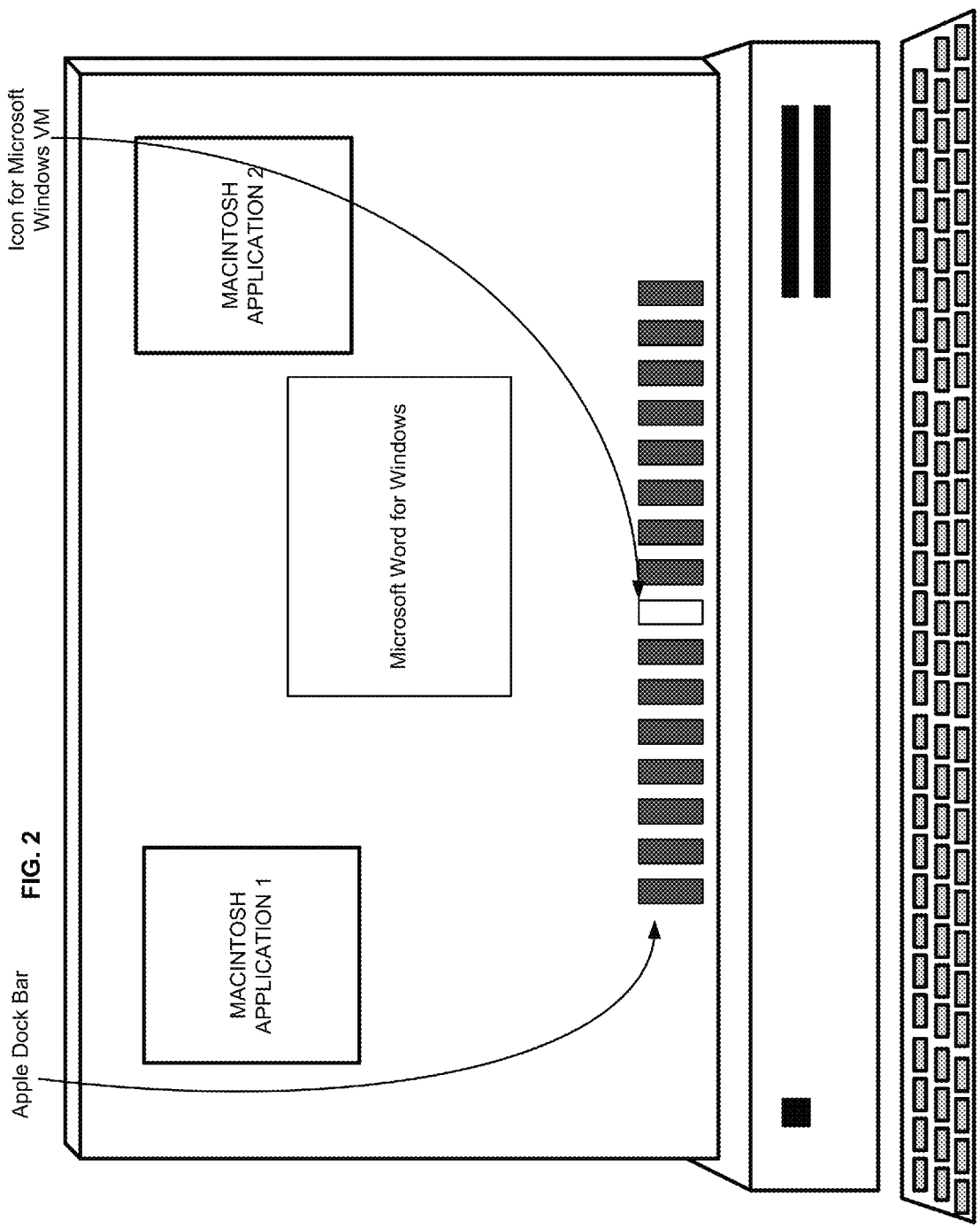
Figure 11:
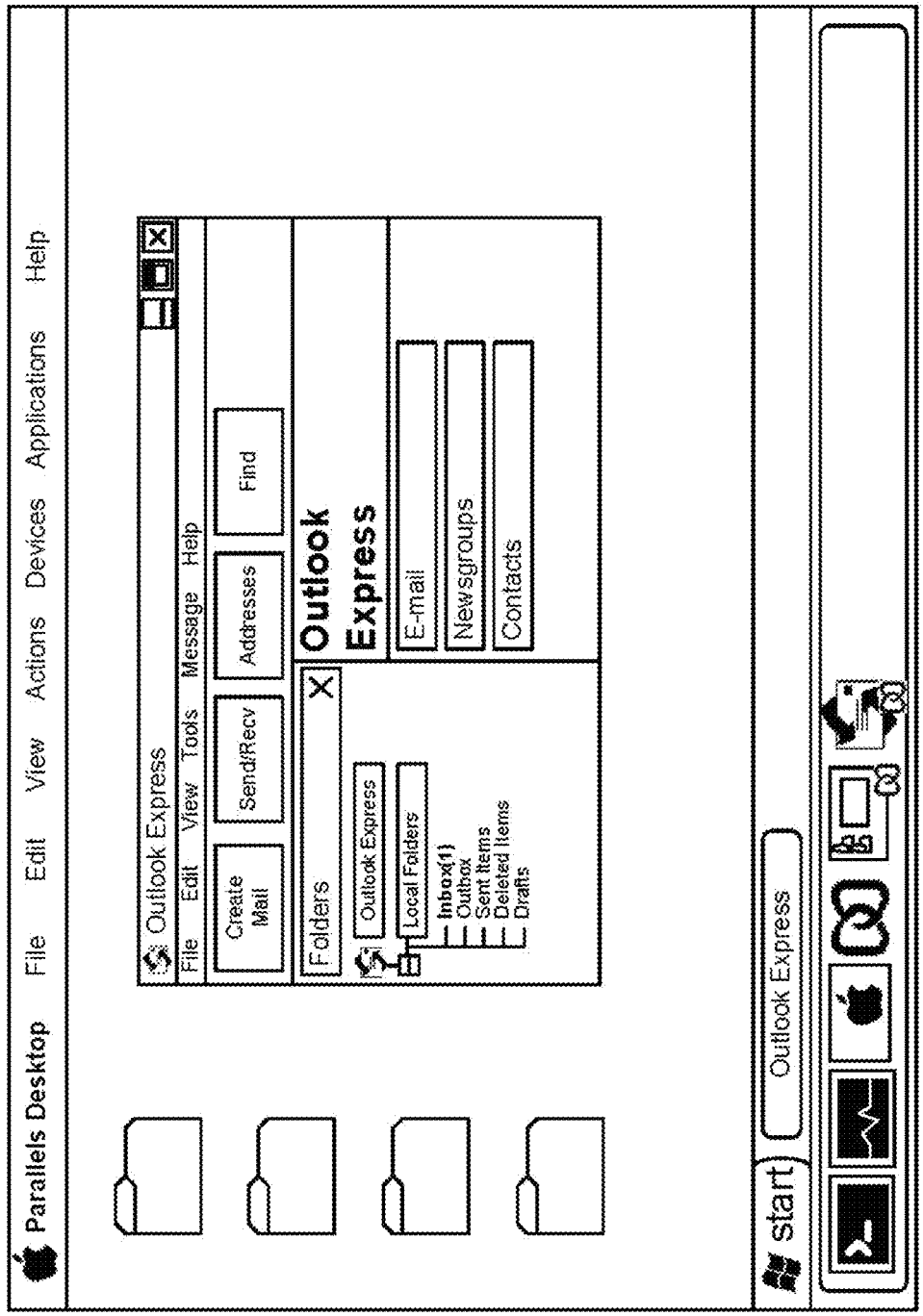

Additionally, it is possible to make the integration of the Microsoft Word for Windows™ into Apple Macintosh more seamless by making everything other than the Microsoft Word for Windows™ window (of the VM) invisible—regardless of the size of the Microsoft Word window. This can be done, for example, by manipulating the properties of the MS Windows™ desktop window, over which the Virtual Machine and the guest operating system have control. Thus, with everything other than the Microsoft Word for Windows™ window being made invisible, all that will remain of the Virtual Machine window on the Macintosh desktop is the Microsoft Word for Windows™ window, see FIG. 2. Therefore, the user will see, on his desktop, the familiar Apple desktop, with, for example, a window for Macintosh application 1, a window for Macintosh application 2, and a window for Microsoft Word for Windows™. In other words, as far as the appearance of the Microsoft Word for Windows™ application, it looks just like any other Macintosh application on the Macintosh desktop, the only difference being that it is a Windows™ application, not a Macintosh application. A figure showing one such MS Windows™ application (here, Outlook Express) is shown in FIG. 11.

One issue that needs to be addressed is reconciling the resolutions of the non-native application window and the native desktop. For example, the desktop might be set to 1024×768, while the non-native application window is set to 800×600. In this case, one option is to maintain the lower resolution of the non-native application window at 800×600 (essentially, displaying an image of MS Word for Windows on the desktop at lower resolution than the maximum permissible). Another option is to force the non-native application window to higher resolution of the desktop. The user can be given a choice of which he prefers. In a "full size" mode of the application, the VM can select from a set of possible resolutions for the non-native application window (in some cases same or different resolution as the desktop one, to improve video card performance).

As yet another option, network protocols, such as X-Windows support on UNIX, KDE, Gnome, Citrix Presentation Server with application streaming, etc. can be used. As yet another option, since the VMM or Hypervisor has access to the memory buffer where the image of the desktop is maintained, the relevant portion of the window that represents the guest desktop can be masked out, leaving only the non-native application window (or group of windows) displayed on the host desktop.

Figure 10:
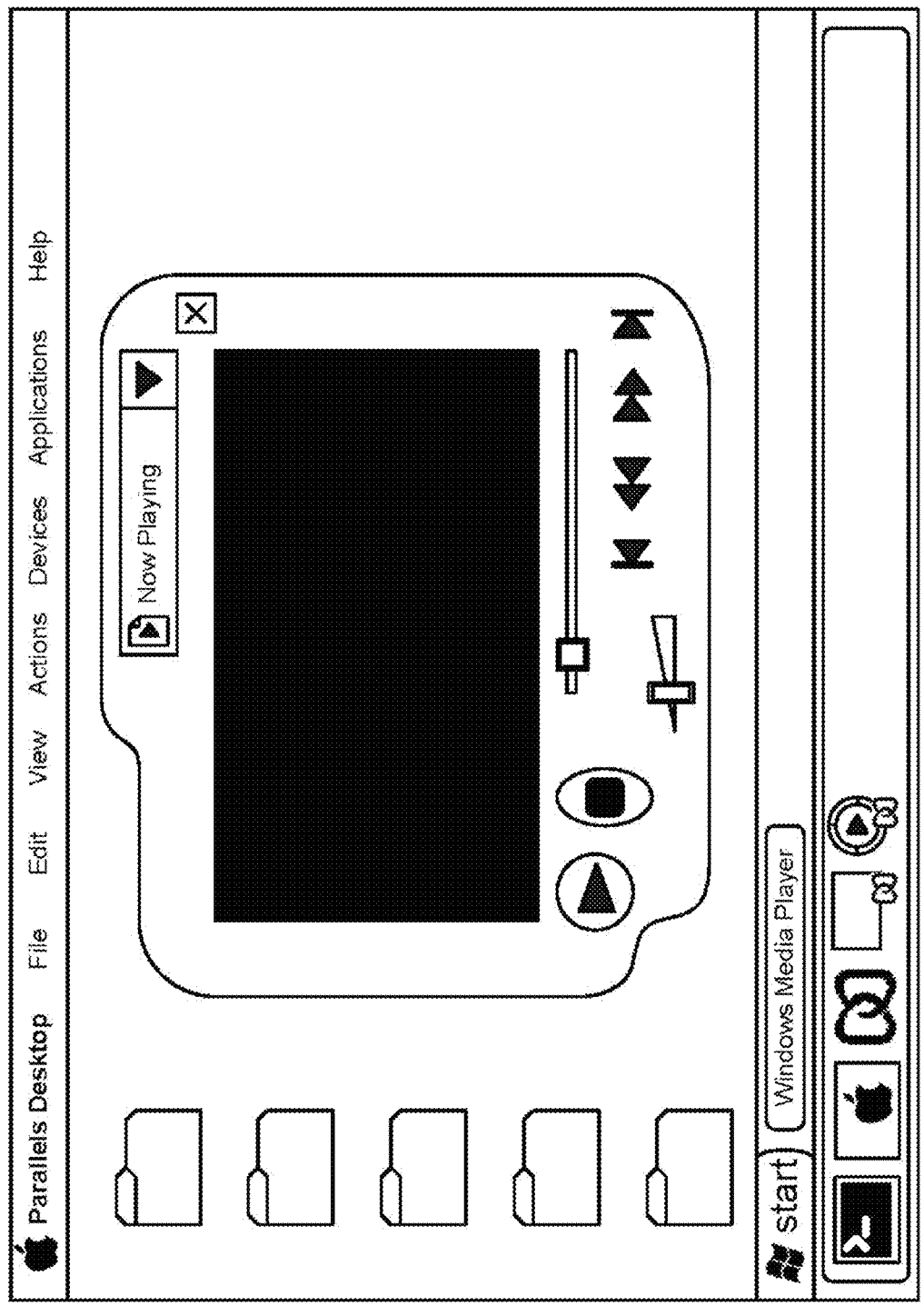

As one option, the VMM or Hypervisor can perform transport-collecting/secondary role, with two subsystems responsible for the window display functions: a guest window data collecting subsystem, e.g., as a part of virtualization environment, and tool gathered window information in the guest OS. The masked out portion can be regular shaped, or can be arbitrary shaped (for example, as with some skins that use a complex-shaped window, see, e.g., the example of Microsoft Media Player in FIG. 10, with the "skin" chosen so as to present a complex-shaped window on the screen).

If a new window is launched from within the non-native application, it is handled similarly—by changing the area of the invisible guest desktop that is masked out, or by using any of the other mechanisms described herein.

Figure 5:
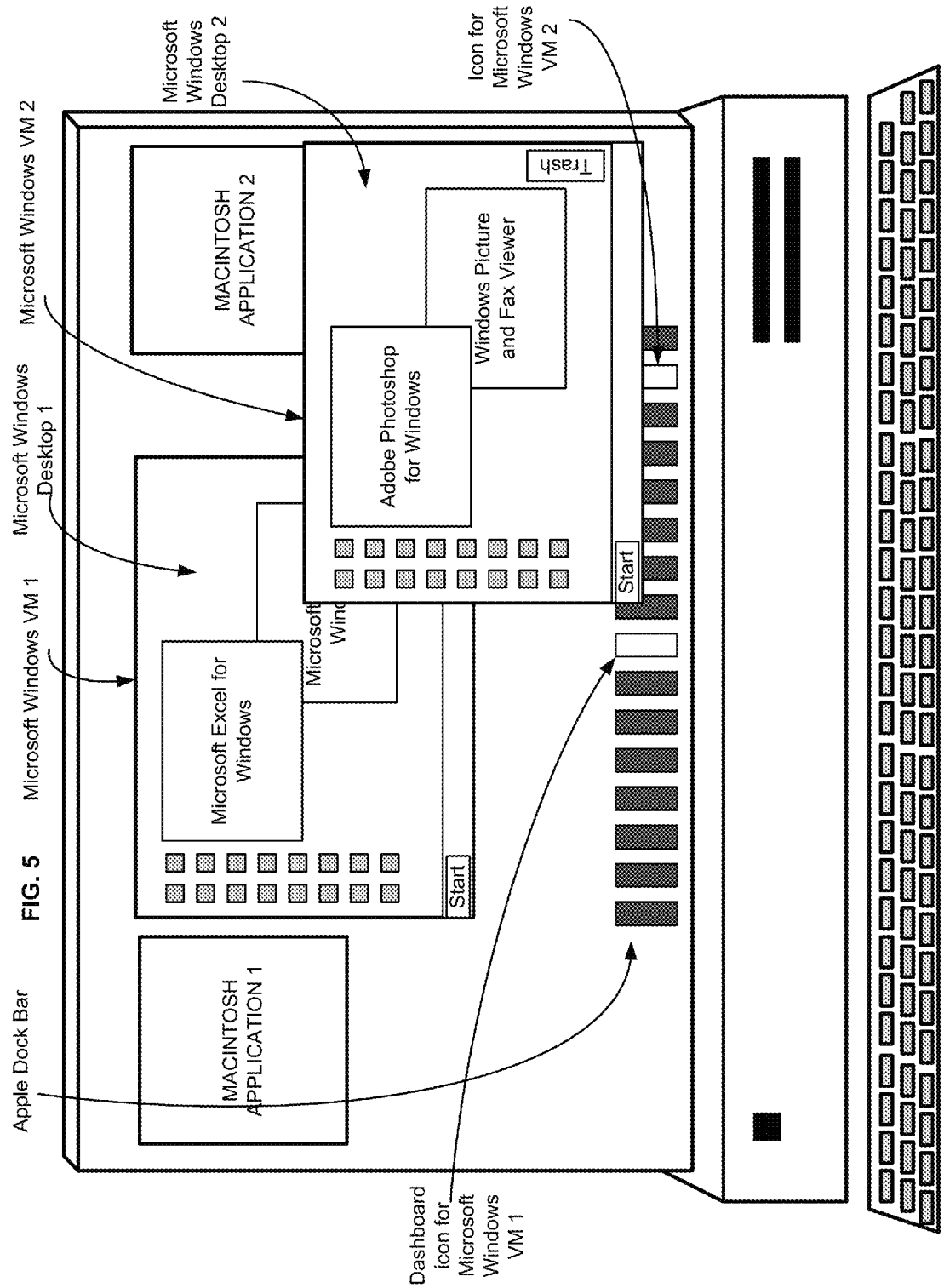
Figure 6:
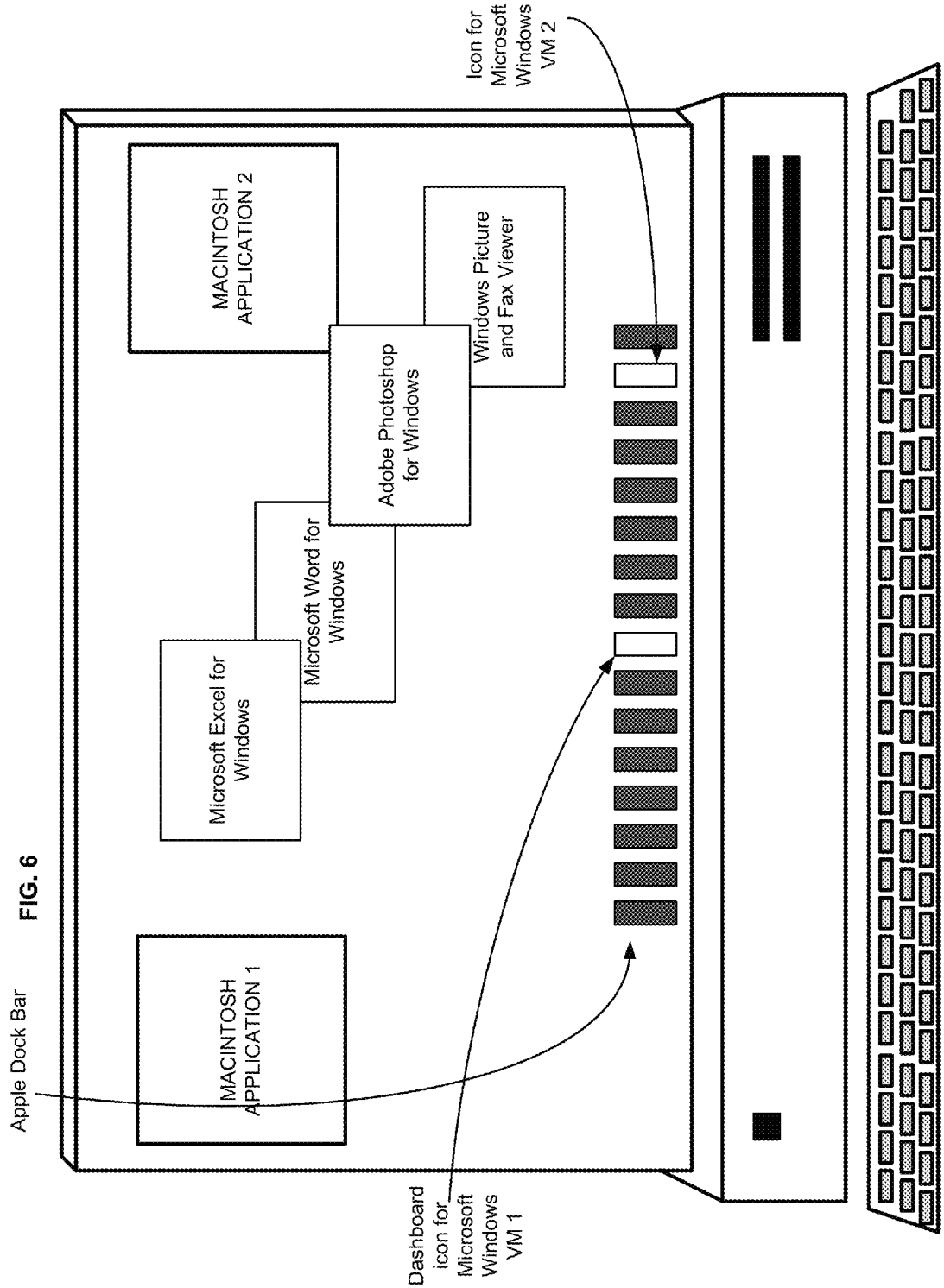

Similarly, if a user wants to launch multiple MS Windows™ applications, he has several options. One option would be to launch a separate Virtual Machine for each such application, see FIG. 5 and FIG. 6 (with both MS Windows™ desktops within their corresponding VMs invisible in FIG. 6). For instance, if a user wants to launch Microsoft Excel for Windows™ or Adobe Photoshop for Windows™, in addition to Microsoft Word for Windows™, a separate Virtual Machine can be launched, the Windows™ desktop in that Virtual Machine can be made invisible, and, as far as the user is concerned, he will see an Apple Macintosh desktop, with Macintosh application 1, Macintosh application 2, Microsoft Excel for Windows™, and Microsoft Word for Windows™.

In one embodiment of the invention, integration of application may be more complex. For example, seamless integration may be required while using OLE objects or something similar. Object Linking and Embedding (OLE) is a distributed object system and protocol developed by Microsoft. OLE allows an editor to "import" part of a document to another editor and then use the object in edited form. For example, a desktop word editing system might send a picture embedded in the text to a bitmap editor using OLE. In the general case, all cooperative editors should run in one execution environment or under direct control of the same OS.

The present invention provides a possibility to call OLE object editors or even browsers from a VEE other than the VEE supporting the main editor. Furthermore, the user's OS, the main editor and OLE editor may be supported by different VEEs. In other words, the main object or file with OLE objects and the OLE object itself may belong to the user's VEE, while applications associated with the main object and OLE objects may be run by other VEEs and even by different VEEs for the main and OLE objects.

Furthermore, the user can have the option of turning the invisibility of the Windows™ desktop in the Virtual Machines on and off, depending on the user preferences. This can be done with a button, an icon, a separate "Properties" option, etc. As yet another option, the invisibility can be partial—in other words, if the user still wishes to see some elements of the MS Windows™ desktop, the MS Windows™ desktop can be made partly transparent, for instance, 50% transparent.

Figure 3:
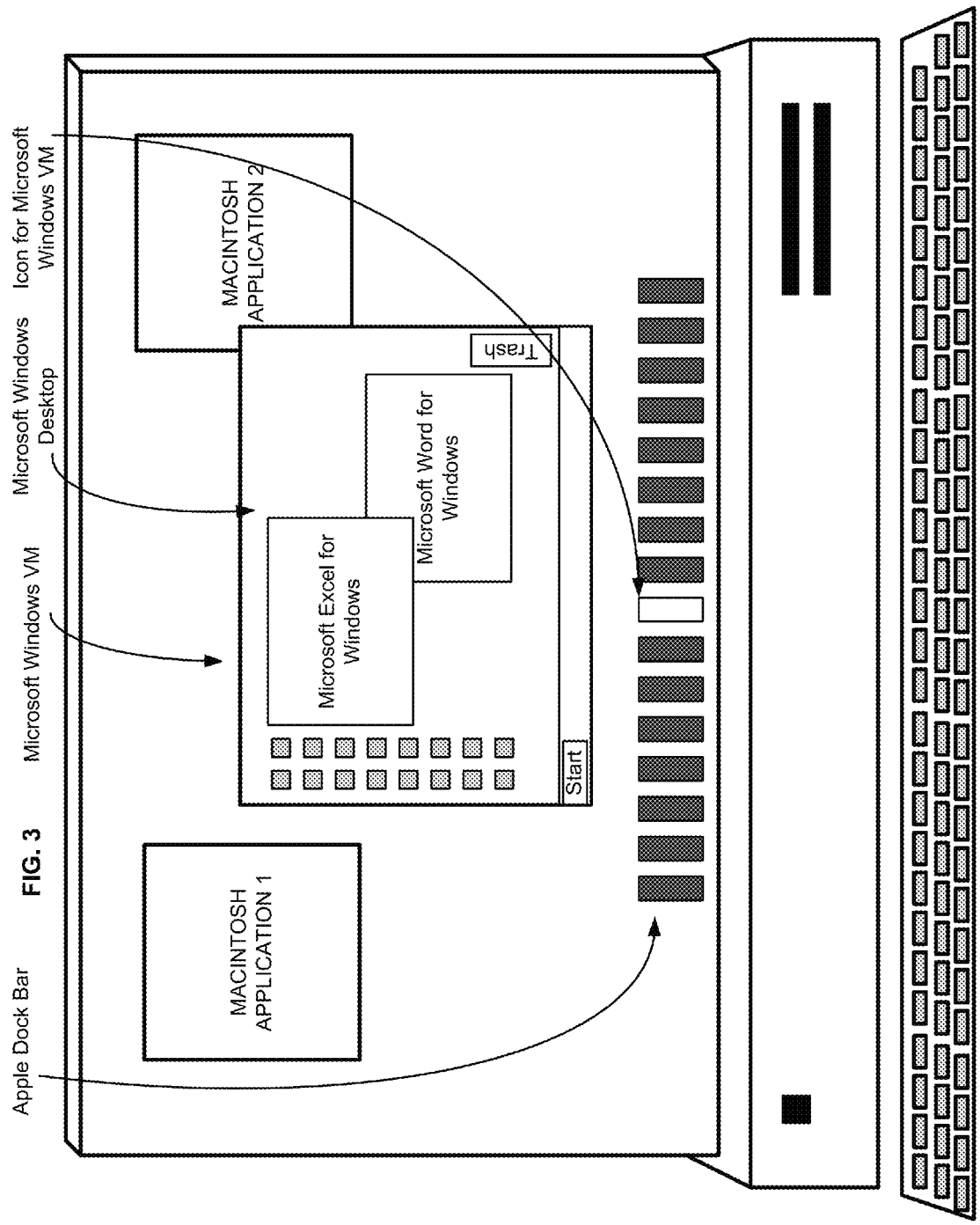
Figure 4:
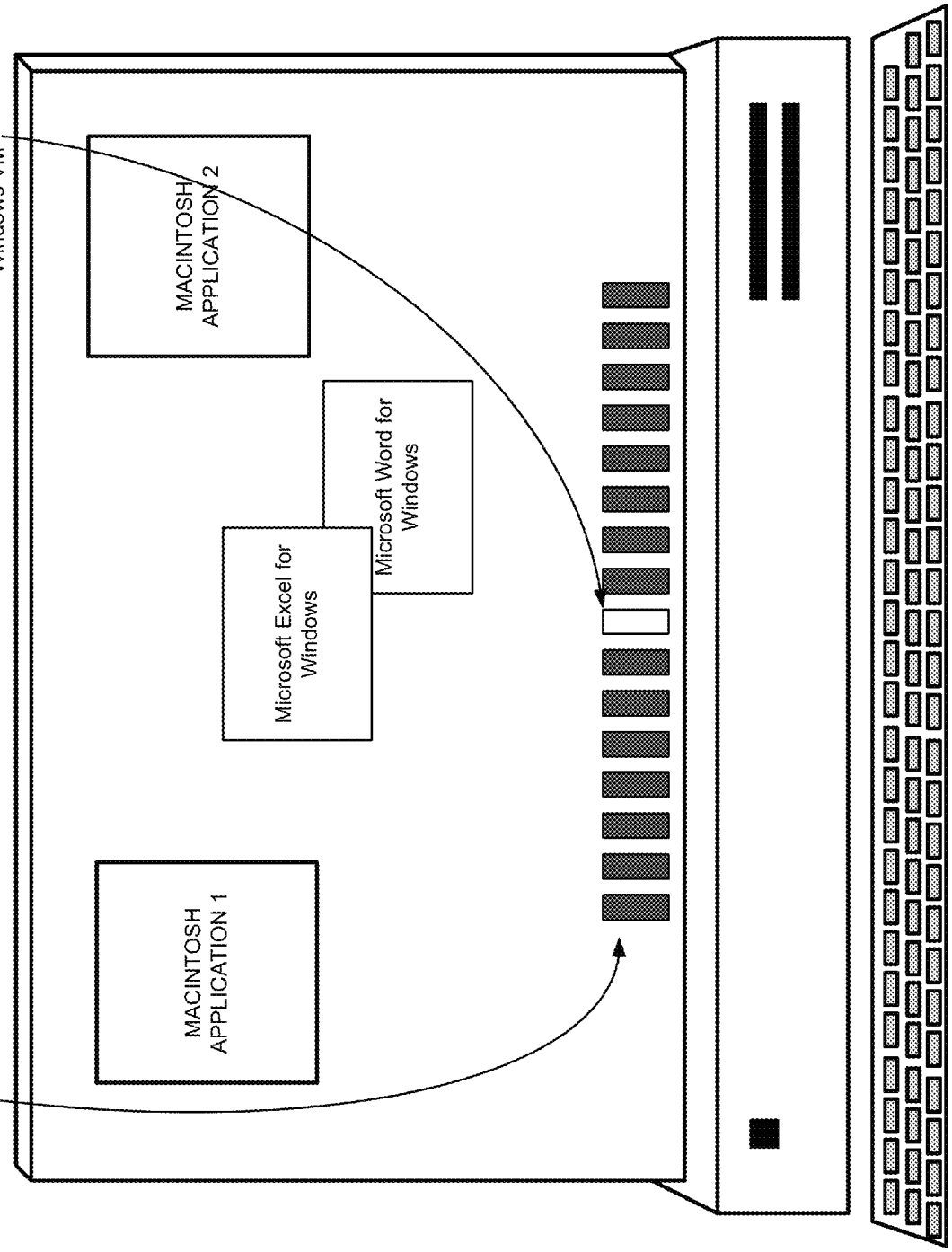

As yet another option, the separate MS Windows™ applications can be launched in the same Virtual Machine, see FIG. 3 and FIG. 4. In that case, however, it should be remembered that the Virtual Machine is treated as a single process by the Macintosh OS (which, in this example, is the host OS, sometimes also referred to as "Primary OS"), and therefore, there will only be one button on the Macintosh dock bar to represent that VM process.

Figure 7:
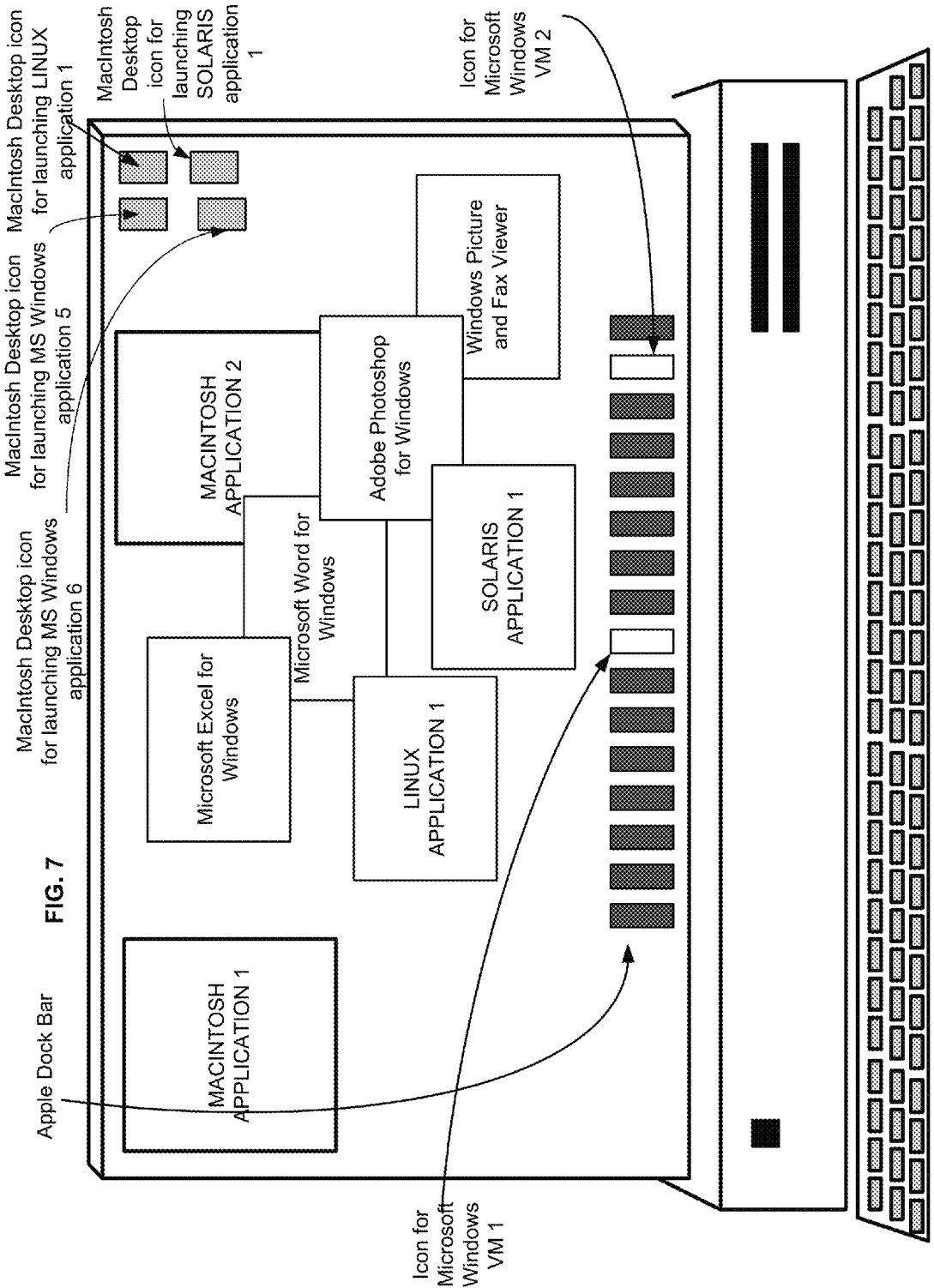
Figure 15:
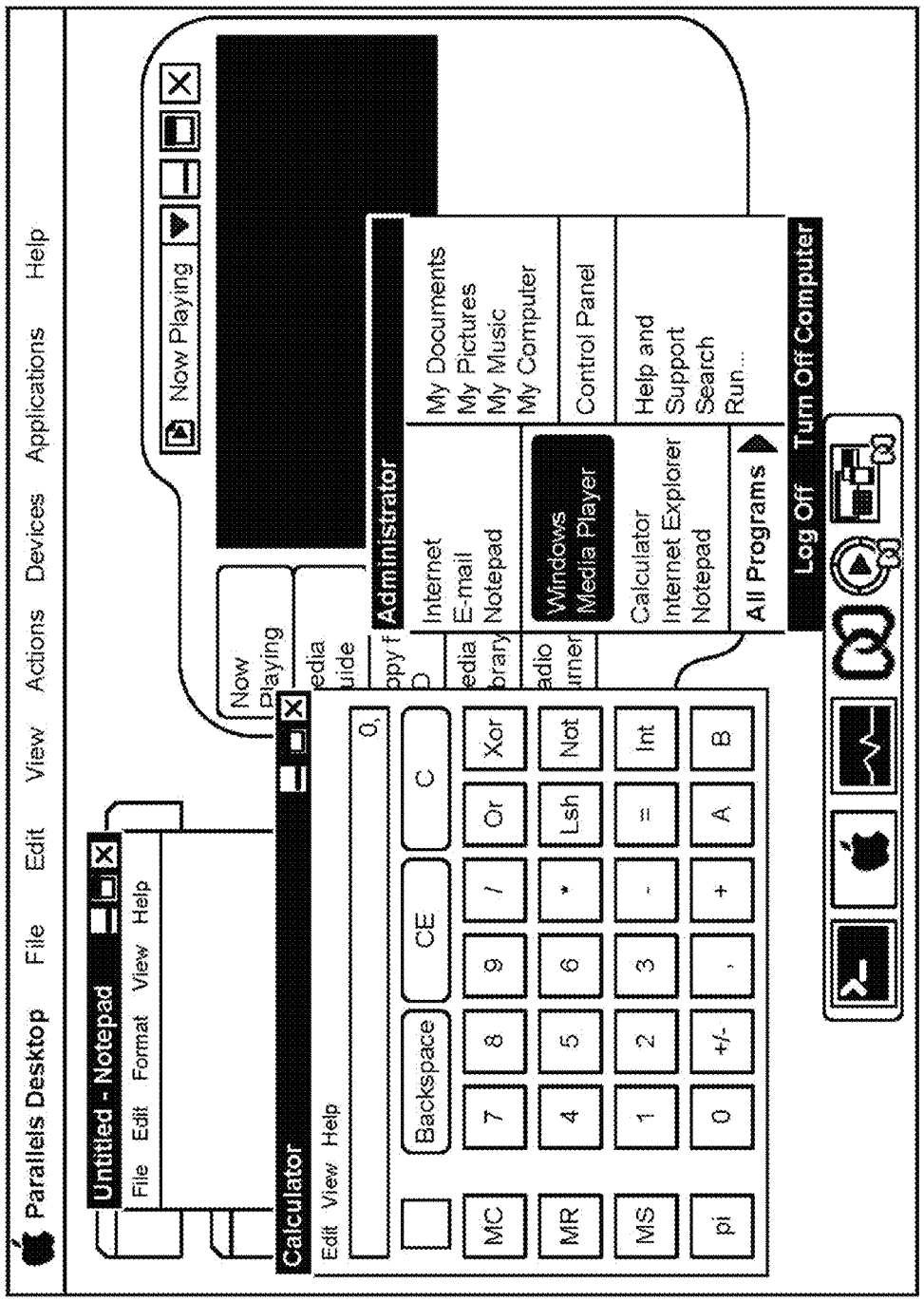

As yet a further option, there can be separate buttons on the Macintosh desktop specifically for launching the particular Microsoft Windows™ applications—for example, an icon, or button, for launching Microsoft Word for Windows™, an icon or button for launching Microsoft Excel for Windows™, an icon or button for launching Adobe Photoshop for Windows, etc., see FIG. 7. By clicking on that button, the user can directly launch the Virtual Machine, the particular Windows™ application within that Virtual Machine, and this process can be automated—in other words, clicking on that icon or button will result in execution of all the steps described above, such that the user is ultimately presented with another window on the Macintosh desktop, with that Windows™ application running in it. This is particularly advantageous for those users who do not wish to concern themselves with the exact mechanics of how the Virtual Machine, and the applications launched within that Virtual Machine, interact with the host operating system, but only wishes to see the final result—a seamless integration of a Windows™ application into the Macintosh desktop and operating system. Another example of such seamless integration of multiple applications, including a popup menu used to launch them, is shown in FIG. 15.

Furthermore, after running, each non-native application can use one icon of a running application (which appears after start of application), or a single icon can be used to designate all applications running from a single VM image, or, alternatively, one icon can be used to designate all non-native applications that are currently running.

Figure 12:
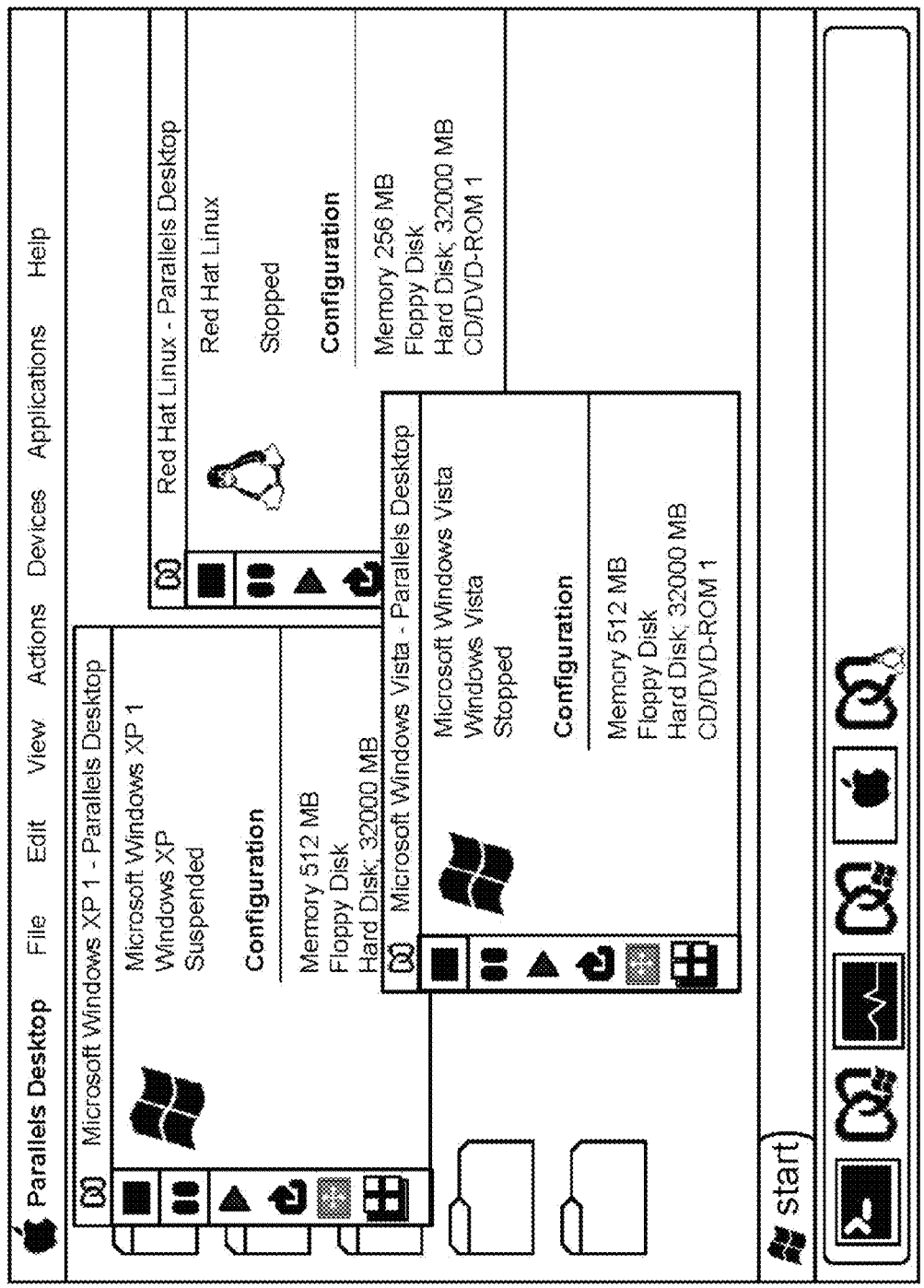

It should also be noted that although the discussion so far has been primarily in terms of integrating Windows™ applications into the Macintosh platform, the invention is not limited to this example. For example, Windows™ application can be integrated in this manner into a LINUX environment. Similarly, applications from several different operating systems can be integrated into a single desktop, for example, the Macintosh platform—in other words, one such Virtual Machine, within the Macintosh host operating system, can be running a guest Windows™ operating system, and one or more Windows™ applications, a second Virtual Machine can be running LINUX, and one or more LINUX applications, a third Virtual Machine can be running SOLARIS and one or more SOLARIS applications, etc.—however, as far as the user is concerned, he is presented an Apple Macintosh desktop, with all the applications graphically seamlessly integrated into the Macintosh desktop, see FIG. 7. A figure of multiple VMS running different guest OS's is shown in FIG. 12.

As yet a further option, it is possible to handle full-screen guest applications by, for example, switching the host OS to full-screen mode.

Furthermore, different icons on the host desktop can be used to invoke different applications within the same VM. For example, the user can click on a MS Word link→Windows™ VEE is started→MS Word is started→MS Word is displayed to user. The user can then clicks on MS Excel for Windows™→Windows™ is already running→MS Excel is started→MS Excel is displayed to the user.

Indeed, the same application within different VEEs may have different icons. In this case, it may be useful to have a graphical representation of supporting VEE on the icon of the application. For example, this can be the symbol of VEE supporting application and/or number of the VEE running on the computer system.

Also, hardware devices, e.g., network adapters, storage drives, printers, etc. may have corresponding icons on the user's desktop even if they are supported by a VEE that is non-native for user. Since some devices may require support of certain applications (e.g., drivers) they may be started in different VEEs that are more compatible (or even the only possible one) for corresponding drivers or other control tools. In one embodiment, for example, a printed file may belong to the user's VEE, the application, that opens files for further printing may run in non-native mode for the user VEE, and printer support means, e.g., network drivers and printer driver, may run in other VEEs. In certain cases, the user can be provided with a GUI for configuring devices and choosing an appropriate VEE for installation. In the case of plug-and-play devices, the choice may be defined by default.

As yet another example, the user can click on a MS Word for Windows™ file link→Windows™ VEE is started→MS Word is started→MS Word is displayed to user→Word loads the MS Word file from the user's VEE or from Windows™ VEE.

As yet a further option, starting the guest OS and the non-native application can be done in the background. This will result in showing only the non-native application to the user—no guest desktop will be displayed at all.

One issue that also needs to be addressed for full seamless integration is interaction between objects within the Virtual Machine and objects of the host operating system. For example, with no Virtual Machine running, but only native operating system and native applications running on, for instance, Apple Macintosh, the user can perform such functions as drag-and-drop and copy and paste from one application to another. In practice, this means that the user utilizes services of the host operating system to associate various objects with various applications. For instance, the user can click on an image within an application (e.g., a JPEG image) and drag it to a window of another application.

In the case of the source application for the drag-and-drop running inside a Virtual Machine, however, that application is normally isolated from the rest of the native applications running on the Apple Macintosh (in this example). Therefore, for full seamless integration, the Virtual Machine Monitor needs to intercept such an action by the user, and then handle it, for example, by recognizing an event (a drag-and-drop within the MS Windows™ application that crosses the window boundary), informing the host OS of that event, and invoking a native drag-and-drop process. Once the drag-and-drop is completed, the VM is informed, so that it can update its own objects. A similar process can be done in the case of copy-and-paste, from within the VM to outside the VM. In a similar fashion, objects can be dragged and dropped from the desktop to the non-native application, or from one non-native application to another non-native application. Drag-and-drop may be used instead of direct association of objects of predefined type (e.g., file with certain extension, or a directory with certain attributes) with certain application if multiple application or even same applications in different VEEs may be used for processing an object.

Furthermore, it should be remembered that when an operating system, such as MS Windows™, is launched within a Virtual Machine, it has its own file structure, which is separate and distinct from any file structure of the host operating system. Therefore, normally, if a user were to try to save a document from Microsoft Word for Windows™ where Microsoft Word for Windows™ is running within the Virtual Machine, the file would be saved to a Microsoft Windows™ file system, not to the host's Apple Mac OS one. For full integration, the file would need to be saved into the Apple Mac OS file system. This can be done, for example, by defining one of the folders in the host OS file system as a shared folder, and giving the VM access to it. As another alternative, the entire file system tree can be defined as a shared folder, with a process that goes through the tree hierarchy, starting with the root folder, and sets the properties of each folder and subfolder to "shared." Alternatively, the VM's file system can be integrated using transparent copy-to and copy-back integration between the host OS and the VM, or between one VM and another VM.

Figure 13:
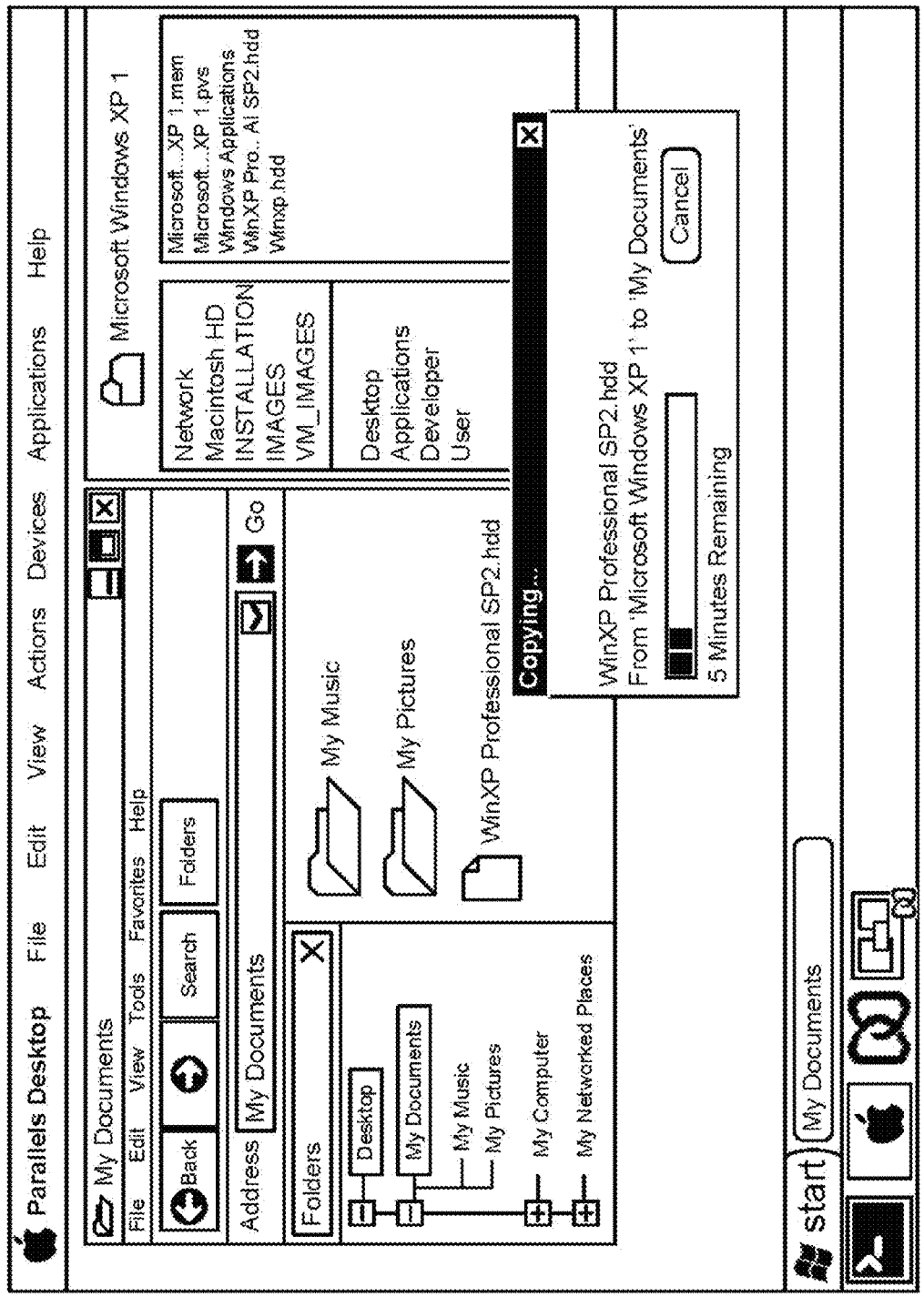
Figure 14:
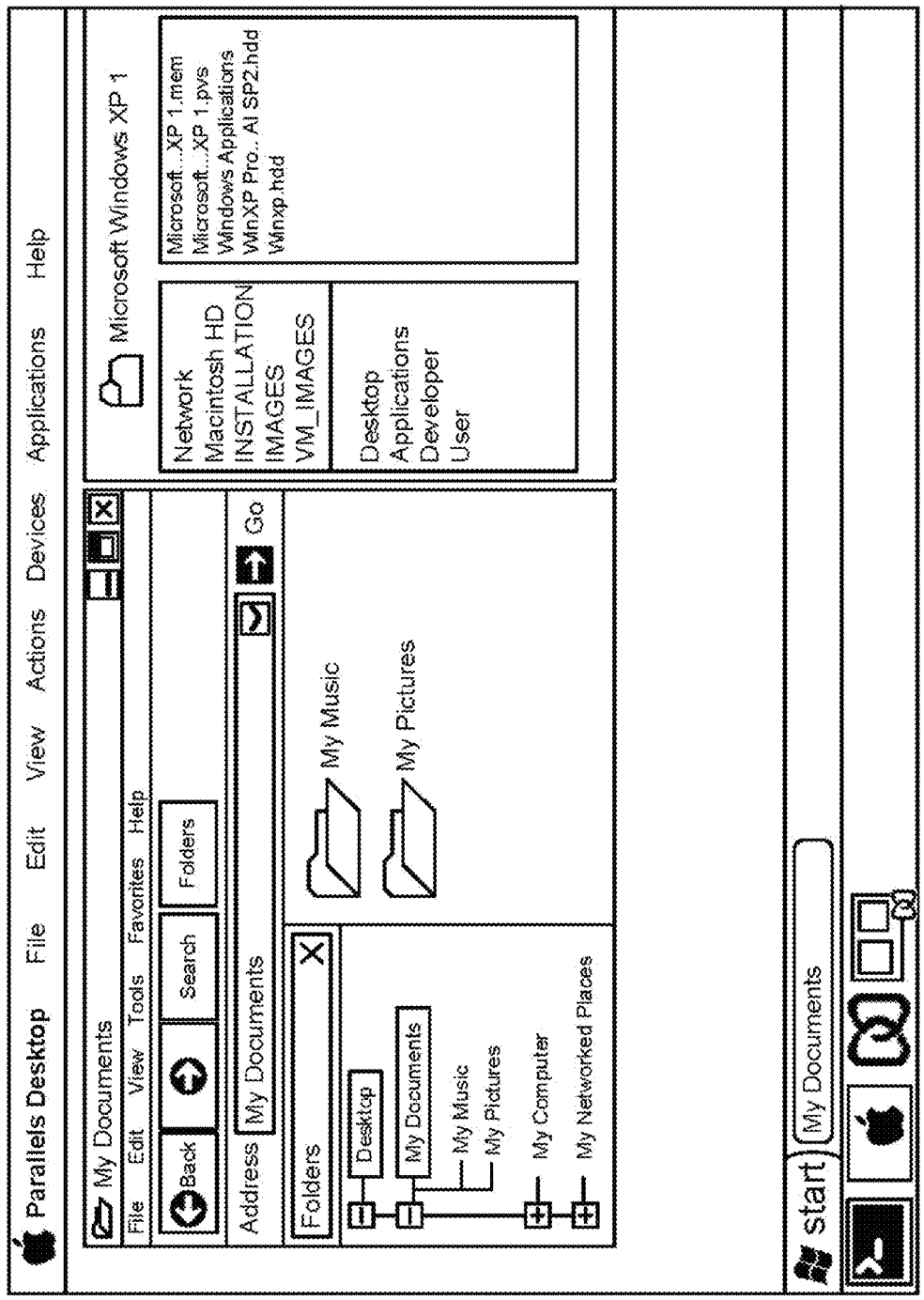

An example of such a drag-and-drop is illustrated in FIGS. 13 and 14, where a file called "Win XP Professional SP2.hdd" is dragged from one VM running Windows XP™ to another VM running Windows XP™ —in the case of the target VM, its file structure is integrated into the host OS file structure.

Although in the discussion above, a Virtual Machine was used as an example of how the non-native application can be launched within an isolated environment, it should be remembered that Virtual Machine is only one example of such an environment. Other Virtual Execution Environments can also be used, for example, Virtual Private Servers, such as those supplied by SWsoft, Inc. Also, the present invention is not limited to any particular type of Virtual Machine—for example, conventional Virtual Machines can be used, Hypervisor-based Virtual Machines can be used, Lightweight Hypervisor-based Virtual Machines can also be used, VMM-based VMs, Hypervisor-based VM with and without hardware virtualization support, with or without security support (e.g., using Intel Lagrande technology, VM/lightweight VMM/AMD secure execution support/etc.), as well as different VPS/VE such as Virtuozzo from SWsoft, Inc., Sun container-based environments, HPUX internal container environments, jail-based environments, terminal sessions of MS Windows™ Terminal Server and/or Citrix Presentation Server or similar.

For inter-VEE communications (and VEE-to-host desktop communications), special stubs/proxies can also be installed, which allow fully controllable (based on appropriate communications rules) means of communications (Inter-Process Communication), thereby giving the applications transparent communications abilities. These proxies/stubs allow the applications to interact in the same manner as they do in normal computer system (for example, users can use clipboard copy/cut/paste operations between different applications running in different VEEs entirely transparently). This can be done, for example, using a shared memory buffer, network means, socket means, etc.

To start a non-native application, a user can use the same icons, menus, file system structure, and/or command lines, and these applications will be visually launched on the standard graphical end user computer on which the user typically works. The installation and start of any application will define an appropriate VEE, in which context this application should be installed and run, as well as appropriate communication proxies. A set of installation/behavior rules will allows automatic selection, creation and start/termination of appropriate VEE.

Different VEEs can also be separated based a "level of trust" for the particular application. This can be based on such criteria as source of application (e.g., downloaded applets via web browser from unknown sites, from trusted sites, with different requirements for OS resources and access to file system and registry, etc, time of activation, estimated load, possible network access level and so on). This approach provides a greater level of separation (and isolation) of applications and resources than, for example, the Microsoft in .NET applications or the "security zones" in Internet Explorer, because it works on application level, not just inside a browser or .NET applications context. However, the present approach includes the browser and .NET applications as well.

The concept of the VEE can therefore, in one embodiment, be used to create secure "zones" in which the applications "live." For example, if desired, each application may exist as a process within its own VEE. In this case, there can be a single VEE for Microsoft Word for Windows™, a single VEE for Microsoft Outlook™ (or Outlook Express™), a single VEE for a web browser, etc. Alternatively, applications of a similar type may be launched within the same VEE. For example, Microsoft Word™ and Corel WordPerfect™ can be launched within the same VEE. Similarly, different email clients can be launched within the same VEE, or each within its own VEE.

Also, for fully seamless integration, the user should be able to drag-and-drop, copy and paste, from one application inside one Virtual Machine to another application inside another VM—for example, taking text from Microsoft Word for Windows™, copying it, and pasting it into a LINUX OpenOffice application.

By clicking on a desktop link or icon, a native system launcher can be invoked, which can accept an argument (e.g., an application name, a configuration file for a VEE, a VM, etc., name of the file to be edited from the native system or the non-native system, name of file together with the application that will be used for editing), and perform the activities necessary to activate the VMM, launch or recovery of the snapshot of the VEE instance, launch of the application within the VEE with optional pre-configuration and file access, etc.

The user application window can be shown partially on the host desktop. For example, the user needs to see only the "valuable" part of the application and in most cases this excludes window title and window border. Often, the second VEE differs from first VEE. Therefore window title and window border, which create a "look and feel" of the window and look as a foreign window for first VEE, can be eliminated from the display seen by the user. Furthermore, the window title and window border can be changed to create a more native look-and-feel of the user application.

User applications can be shown in different ways on the host desktop. The following examples are not intended to be exhaustive: a pixel set (image) drawn on the second VEE desktop; a graphical primitive set (e.g., points, lines, rectangles, icons, bitmaps, text lines and etc.); OpenGL primitives; commands for hardware 2D/3D graphic accelerators (DirectX compatible or the like); window set translated to correspondent first VEE window set; etc.

The previous paragraph describes an example of how the user application window view can be captured. More generally, the user application, in combination with second VEE, generates a view of its window, this view is captured in some manner by the virtualization system described herein (for examples, see paragraphs above), and the virtualization system simulates/images captured output connected to the corresponding window.

It should be noted that the approach described herein is applicable not only to different host/guest OS's, but also to the situation where the guest OS is the same as the host OS (e.g., an MS Windows™ host desktop and an MS Windows™ VM and Guest OS). Also, the entire desktop can be superseded by the guest desktop. Also, the desktop can be non-native as well, or a VM can be launched within another VM ("nested VMs"). Also, the same OS in guest and host can use direct access of VM support means to video and implement external integration of VM. Note also that the VM can be started "from scratch," or can be started from a snapshot, or some pre-defined checkpointed image.

One desirable feature from the perspective of a user is to have various applications written for different operating systems being available for the user of a certain VEE. Those applications should run in an appropriate VEE, but the process of installation (preferably automatic) should be accompanied by providing a possibility of starting the application from inside the user's VEE. For example, if one OS running on the computer, e.g., the host OS, is the Macintosh OS, and the user's OS/VEE is running Linux, the user might want to edit a Microsoft Word for Windows™ document with a .doc extension. In this example, neither the host OS nor the user's OS natively supports this file extension since neither is running (or is capable of running) Microsoft Word for Windows™. In this common case, the system automatically recognizes that there is no appropriate application for opening the file with such an extension and, for example, that the application required for editing the file could not be installed in user's OS since it is compiled for (or otherwise compatible with) an operating system that is neither of the two (or however many) are installed and running on the physical machine.

In this case, the first step is for the system to recognize that the application being invoked is written for another operating system (or possibly, for another version of the operating system, or, possibly, is one that for whatever reason, such as security considerations, needs to be installed and activated in a different VEE). For example, a user who is running Mac OS as the host OS, and Linux as the guest OS inside the VEE, clicks on a .doc file, attempting to activate Microsoft Word for Windows™ associated with this file extension. The system would then check that there is another VEE already running that might be compatible with this application. If there is one, then the application can be installed (if it isn't already) in that VEE. If there isn't, then the system needs to first install the VEE. After installing the VEE, the application (in this example, Microsoft Word) can be installed in that VEE.

As an alternative, the allocation may be invoked by using autorun media. For example, upon inserting in the DVD drive, autoplay DVD will launch the user application that may be installed in the VEE or may be stored on the DVD and requires the VEE OS for launching and running. In one embodiment, autorun media may contain a snapshot of the VEE that may be restored on the computing system. The same mechanism of invoking the user application may be implemented while using autoplay media.

In some embodiments, starting the VEE and/or installing the user application may be provided when a user invokes a user application that is non-native to the host OS and/or to other OSes, e.g., already installed VEEs. Then the user application may be started. The application may be indicated by the user or may be chosen from the database related to certain application required for certain file types, connected devices, used media and so on.

After installation, the relevant configuration issues are addressed, such as generating or installing appropriate configuration files, ensuring that the register settings are appropriate, etc. The host OS also needs to make sure that its config settings are compatible with the newly installed VEE and applications. A procedure of installation the application in the appropriate OS (or just activating the application in user's OS) can involve "tuning" of the user's OS and the host OS being responsible for supporting multiple VEEs on a single computing system. For example, from the view of the user's OS, the application should be registered as a default application for opening files of a certain type (in this example, files with .doc extension). Preferably, the application should have settings, corresponding to a user's profile, required for starting and functioning of the opened application.

For example, if an antivirus application is servicing OS processes of other VEEs, scheduler, security policies, etc. should be registered for that VEE. For example, this can include a set of tools required by user, graphical representation settings, auto-save parameters, integration with other applications (plug-ins, browsers) and so on. Since similar applications, such as word processors of different versions may be installed in different VEEs, an appropriate VEE for starting the application may also be defined. In addition, depending on implementation of multiple VEEs, and the host OS, part of the virtualization environment/system (Hypervisor or the VMM, etc.) can should provide inter-VEE communications (including simultaneous usage the application by multiple VEEs), and maintain a control structure that operates with data sensitive to the context of the VEE that calls the application.

It is also worth noting that as far as the user is concerned, the application (e.g., Microsoft Word for Windows™) is local to his machine, although, in practice, this need not be the case. The application can be local, running inside one of the VEEs, or the application can be remote, for example, running in a VEE on a different physical machine, for example, on a network server, and, in this case, the user can manipulate/communicate with non-native application through a so-called remote console. Also, it should be remembered that the process of first installing a VEE from scratch, and then installing an application from scratch may be relatively time consuming. However, as discussed in U.S. patent application Ser. No. 11/264,100, filed on Nov. 2, 2005, entitled SYSTEM AND METHOD FOR PRE-INSTALLING OF VIRTUAL PRIVATE SERVER FILES, incorporated herein by reference in its entirety, VEEs can be "cached", such that virtually everything that needs to be done to activate and launch a VEE is already "pre-done"—in other words, the config files are set up, the data files of the VEE are copied, etc.—all that remains is to finish the configuration of the VEE, and launch it, a process that is not very time consuming at all. Similarly, if an application needs to be installed from scratch, this can be relatively time consuming, however. Template files of a VEE can be used for installation of an application, shortening the process considerably. This feature may be used when the same hardware system has multiple similar OSs installed in different VEEs. In this case, the installation of the application in the required OS needs simply adding links to the directory and registry hive templates. If the application is initially installed on the hardware system, using such templates may be advantageous over traditional installation.

As yet another aspect of the configuration, the host OS, and/or the guest OS for which the installed application is not a native application, needs to have a link to the newly installed application, which may be, as noted earlier, running locally on the same machine, or running remotely on a different machine, such as on a networked server.

Optionally creating the link to the VEE can be followed by updating security settings of the non-native VEE, e.g., firewall rules, security policies and so on. Furthermore, creation of links to the application can be accompanied by additional registry settings or libraries' updating. For example, file associations, default setting or other parameters required for full integration the program in non native VEE may be modified. Also, in the process of installation of an application program in a VEE that is not compatible with that VEE's OS, checking or predefining other VEEs and installation the program in a compatible VEE can be done, for later starting the application from a non-compatible VEE.

The user may see a set of prompts during application installation. For example, the user may be prompted to virtually install the application in another VEE that is already installed on the hardware system, to start installing a VEE compatible with the application, and so on.

As an option, installation of a reduced OS required for the application support may be performed as well. Thus, the VEE on which the new application has been installed may have a full operating system, or may be an operating system with reduced capabilities, for example, only those capabilities that are necessary for that particular application. This can simplify the installation of the guest OS considerably, and shorten the time that it takes to do so. It should also be noted that many of the modern operating systems occupy hundreds of megabytes of disk space, and occupy several megabytes of memory when running—even though frequently not every application requires every capability. This enables installing and running an "abridged" version of the operating system, geared towards the particular application at issue.

The process of installation of the application in a newly created/launched VEE can also involve creation of links in other VEEs and/or in the host operating system, with the links pointing to the application. Also, other administrative tasks need to be performed, so that the application can run properly—for example, the communication channels need to be specified and set up, the application may need to be given access to one or more ports, the security policy of the machine may need to be configured to reflect the fact that a new application may be accessing various communications hardware of the computer, various daemons may need to be launched to support the application within a certain VEE, etc. Examples of such mechanisms are also described in U.S. patent application Ser. No. 10/703,594, filed on Nov. 10, 2003, entitled VIRTUAL PRIVATE SERVER WITH ISOLATION OF SYSTEM COMPONENTS, incorporated herein by reference in its entirety. Also, U.S. patent application Ser. No. 09/918,031; Filed: Jul. 30, 2001, entitled VIRTUAL COMPUTING ENVIRONMENT, incorporated by reference herein in its entirety, and/or U.S. patent application Ser. No. 10/837,757, Filed: May 4, 2004, entitled VIRTUAL PRIVATE SERVER WITH ENHANCED SECURITY, incorporated by reference herein in its entirety, illustrate examples of VEEs where the invention may be used, and also illustrates isolation of various processes running on the same hardware machine.

Firewall rules, anti-virus definitions, and other security policy aspect of the computer may also need to be updated.

Furthermore, the creation of the links to the newly installed application may be accompanied by appropriate registry settings and library updates. Furthermore, to fully integrate the new application with other non-native VEEs may also require that those other VEE recognize the existence of the new application, and associate certain parameters with it. For example, other VEEs may need to associate the .doc extension with Microsoft Word that is running in a newly launched VEE. In this case, in the process of installing the application in one of the VEEs, the user of hardware system may be prompted if the application should be registered in other VEEs. For example, a graphical representation of a list of VEEs that may be active on the computer, along with checkboxes, may be presented to the user on a display during installation.

As yet another option, if the system determines that the entire virtualization suite needs to be installed, it may do so—for example, the process may or may not support hardware virtualization, the full virtualization approach may need to be taken, an entire Virtual Machine may need to be launched "from scratch," that, for example, fully virtualizes the entire processor and the hardware of the computer, etc.

Furthermore, the installation process can involve defining associations required for calling non-native application objects. For example, this can include file type association, default editor or mailing program, plug-ins, etc. For example, MS Excel can be associated with .xls files viewing and editing. As an option, alternative default programs may exists in different VEEs, e.g., different versions of MS Outlook. Note that the Graphical User Interface can be implemented not only on network servers, but also on single workstations. The hardware system (e.g., single node, cluster of nodes, or single node with cluster of CPUs) has display means and performs operation with GUI support.

Also, it should be noted that the same file type extension may be associated with different VEEs, in other words, with different installed applications. For example, in one VEE, the link can point to a VEE that is running locally, while in another VEE, the link can point to a remote VEE with the application. This may be useful for security considerations—for example, files on a local drive can be opened with one VEEs application, while files received through email (and presumably running a high risk of virus infection) can be opened with a different, e.g., remote, VEEs application. Also, even for the same file extension, different applications can be used. For example, an Open Office (Open Source) word processing application, can work with many .doc files, however, some of the more advanced aspects of Microsoft Word's files require the full version of Microsoft Word.

Furthermore, the host OS can be responsible for the graphical user interface, or the VEE can be responsible for it. In other words, the question of how to distribute responsibility for display of the desktop, icons, guest desktop, etc. can have different solutions. Furthermore, it is possible to have some aspects of the graphical user interface as the responsibility of one VEE, while other aspects are the responsibility of another. For example, the window appearance of UNIX type applications and Windows™ type applications is not exactly the same—the scroll bars, command bars, etc. of the windows are somewhat different. It is also possible to have the application itself (e.g., a Windows™ application) be responsible for the contents of that is displayed in that application's window, while a different application, for example, Mac OS, is responsible for the appearance of the scroll bars, and other features of the window itself—this provides a more consistent user interface, if the user so desires. This feature can also be turned on and off, at the user's discretion.

Furthermore, other aspects of the graphical user interface can also be integrated. For example, the dialog boxes in UNIX and the dialog boxes in Windows™ are different (even when they accomplish the same function). In this case, a user may prefer to see dialogs in UNIX style (if that is the user's operating system) while calling Windows™ application from an external VEE. If the user asks for "native" interface when calling the "non native" applications, the VEE that has the primary responsibility for that aspect of the graphical user interface will substitute a Windows™ interface instead of the graphical representation of the UNIX interface. Another interface issue is that user's file system structures (shared for that user and/or private) should preferably be visible to the user as the only available structures.

For example, as an option, when a user logs into the system, if multiple different operation systems are running (as either host or guest OS's), the user can be offered a choice of which type of graphical user interface he prefers—for example, Mac OS, Windows, LINUX, etc.

As yet another option, even if not all of the possible choices of graphical user interface and their corresponding operating systems are running at that moment (but can be launched), that choice can also be presented to a user, and the relevant guest OSstarted, if necessary, just for the purpose of the graphical user interface (and optionally for other purposes as well, but possibly solely for that purpose).

As yet a further option, an icon for launching the particular application can include some indication of which operating system needs to be launched in order to enable that application, and this is particularly useful if that operating system is not at the moment running in one of the VEEs. On the other hand, if the relevant guest OS is already running, then the indicator might not be displayed with the icon.

As yet another option, the VEE that is launched primarily to enable installation of a particular application can itself be an "abbreviated" version of a general purpose VEE, particularly where all of the functionality of the VEE is unnecessary in order to install and run the application at issue.

For example, the VEE can contain a limited version of the operating system's binary code. In other words, the installation of the application can be wrapped in an installation of the VEE (full or limited version), guest operation system (full or limited version) and the application itself.

For example, a specific type of a DVD is inserted to the drive and the first VEE does not recognize this DVD format. Such type of a DVD can be associated to play this format inside a second VEE. Another such example is an "unknown" USB device for the first VEE but which is known to the second VEE.

Furthermore, the second VEE can be launched automatically by the first VEE that detects the unknown device in a plug-and-play manner. The medium or device is inserted or connected to the corresponding hardware. Special software hooks the insertion event, detects the type of inserted medium or device, and, if there is an association between such a device type and the VEE, launches the second VEE to worth with corresponding device.

Furthermore, the VEE, even if running remotely, on a networked server, can have access to a local hardware device, such as a local disk drive with files, or a local CD ROM drive, etc.

Most modern VEEs provide a means to select which tool the user wants to use for recently inserted medium. A dialog window pops up to interact with the user, showing a list of registered applications for maintenance of an inserted medium. The second VEE associated with such medium or device can be one from the list.

Medium (device) type term can be specified any complex condition. For example, it can vary from device class to device identifier or from medium class to data content of the medium.

As yet a further option, a file of the host OS required for handling the user application running in the VEE may be shared for common access of the host OS and the VEE. If the security policy protects the host OS and the VEE from sharing files, an additional communication channel for transmitting file data may be implemented.

Furthermore, in an alternative embodiment, when multiple user applications are invoked from the host OS, all application windows may be placed on the desktop. This can be done in a number ways. In one embodiment, the VEE desktop (except the windows of these applications) may be hidden. In another embodiment, each user application has a separate window on the host desktop. Also, the user application window may be displayed in the full screen mode or can have the reduced size.

The user application can also be shipped with drivers, services and other system service tools. Alternatively, the user application can configure other applications, devices, some operating system parameters, and so on. The relevant aspect is not what exactly the application function is, but which aspects of the second VEE are included in the application in order for it to perform its function. In any event, the invention can be also used for launching such applications.

When system elements are hidden during user application running they can be shown, for example, in a context menu of the application link in the first VEE.

Furthermore, if for example first VEE is Mac OS with its Dock Bar, the second VEE is Microsoft Windows™ launched under VM control, and the Dock Bar shows all launched applications. The Mac OS shows a VM application icon in the Doc Bar. This icon has associated with this item a context menu. Microsoft Windows™ has a "Start" menu, which can be shown as a submenu in Mac OS context menu. Also, other control items (Desktop, Control Panel, Task Bar, etc.) can be mapped in the same manner to this Mac OS context menu. Creating a control item mapping of the second VEE to the first VEE is very helpful especially in the cases when non-native application is shown and other items are hidden. Without mapping, the user cannot easily manipulate the second VEE OS when it is running, which is used for non-native application launch. Due to second VEE control item mapping to the first VEE, it is possible to manipulate not only application launching, but all second VEE OS aspects.

Such integration can be extended by associated icons captured from second VEE. Also, keyboard mapping can be implemented in this manner, so that the user can have his choice of, for example, Apple keys and their functions even when using Microsoft Windows™ applications (or vice versa—using Microsoft Windows key mapping when using an Apple application.

As yet a further option, the Start menu from Microsoft Windows can be shown on the Mac Dock Bar as an expandable icon/folder—i.e., all the folders, applications, etc. that a user sees when clicking on the "Start" button can be shown in the Mac Dock Bar under an icon that expands to show applications, folders, etc. As will be appreciated, the concept is applicable not just to Windows/Mac Doc Bar, but generally to showing non-native start menus/folders/icons as a folder on the native taskbar. Also, settings, such as parental control settings, can be applied from a guest OS to the host OS, and to all or some of the other guest OSs.

As yet a further option, each VM maintains a guest video memory where the contents of the guest desktop, guest windows, their coordinates, etc. are maintained. A utility can mask out everything on the guest desktop except for those windows that are displayed on the host desktop. Then a utility in the host OS images the remaining portions (i.e., the windows being seamlessly integrated) onto the host desktop, such as using 1:1 mapping, or using different ratios. As a further alternative, various remote desktop protocols, such as RDP6, can be used to map the window. It will also be appreciated that the invention is not limited to the current versions of Microsoft Windows or Linux or Apple Mac OS, but is equally applicable to future versions and extensions.

Figure 19:
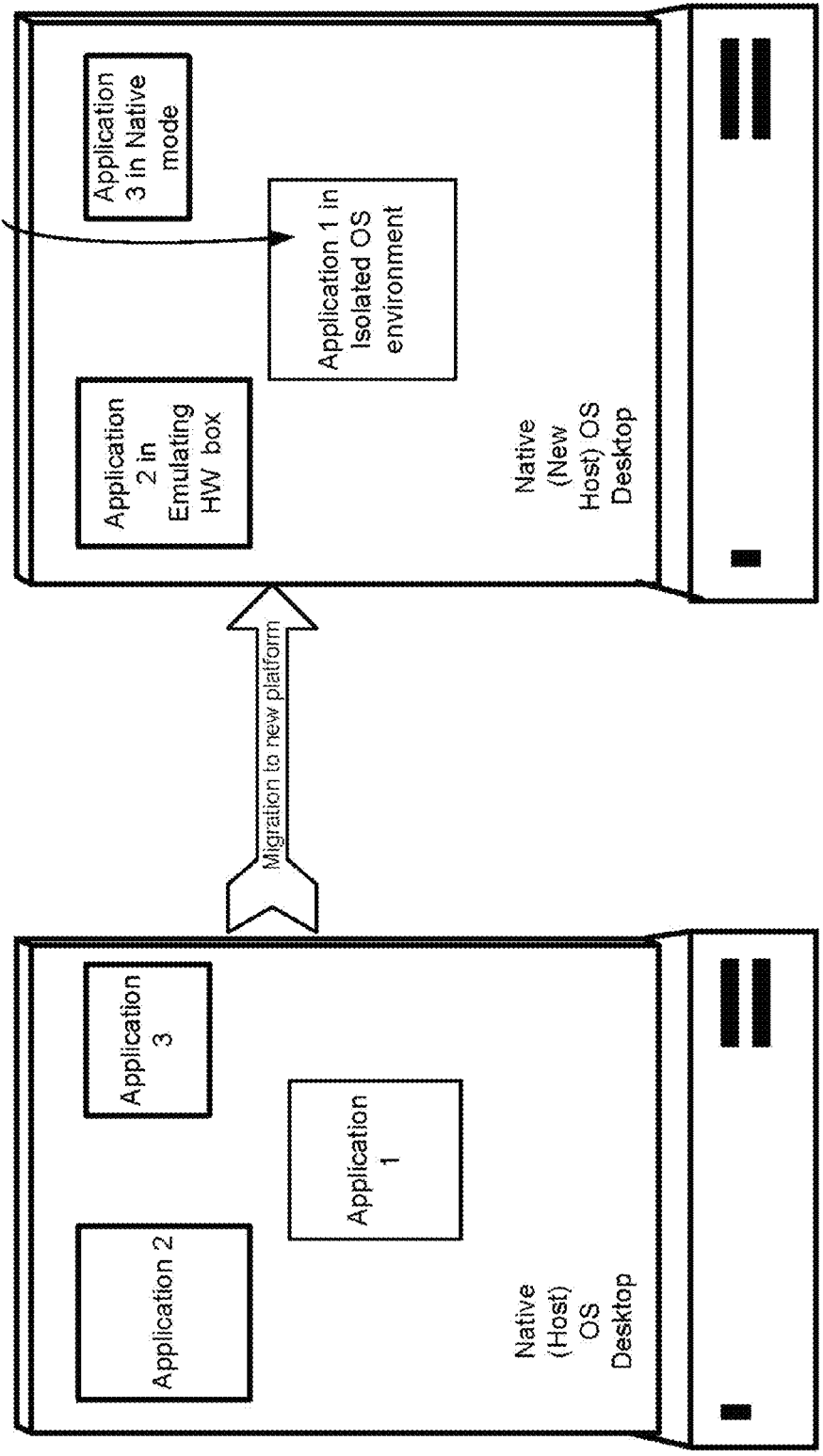
FIGS. 19-20 illustrate seamless migration of legacy applications to newer OS versions.
Figure 20:
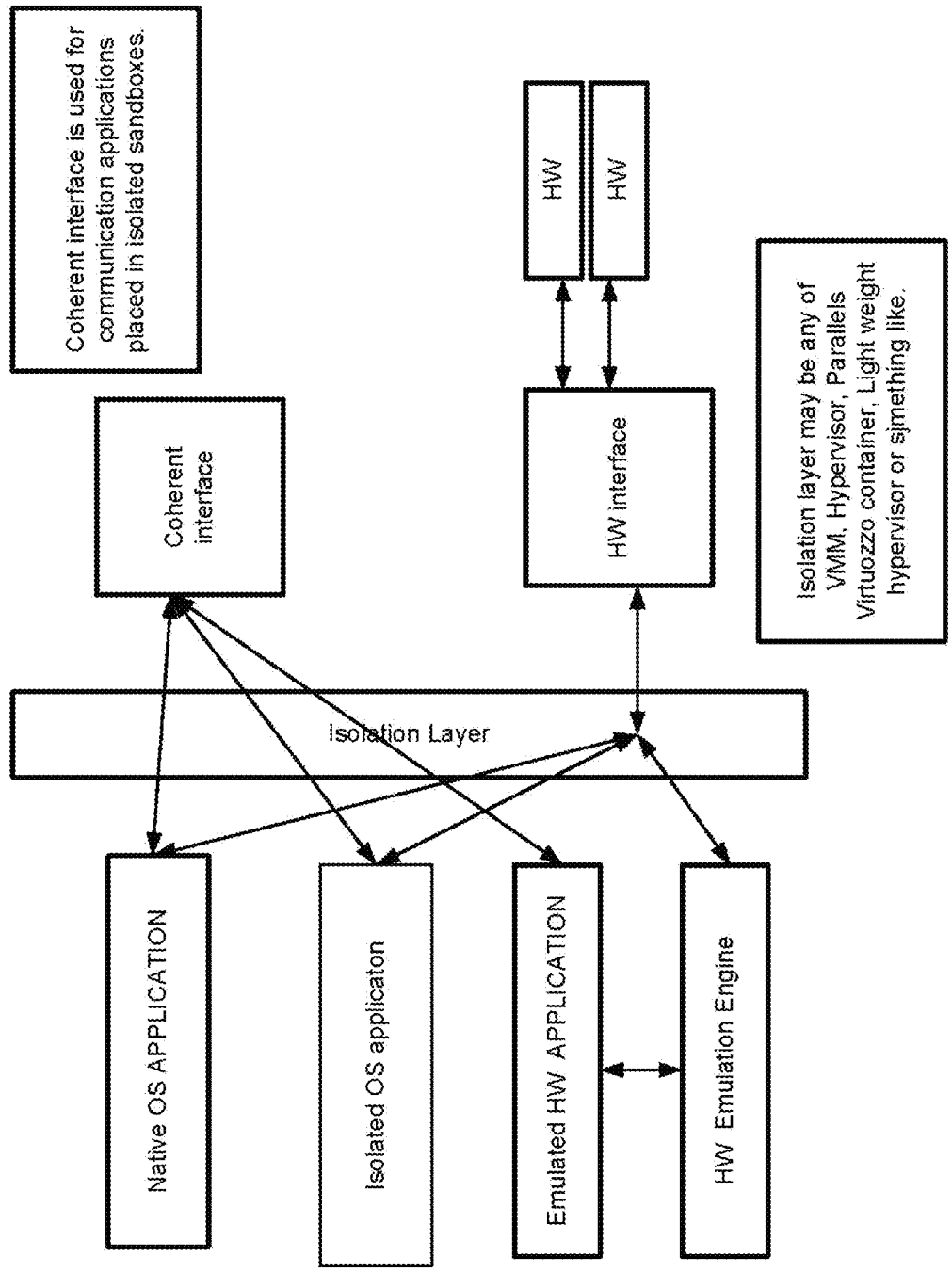

As a further embodiment, illustrated in FIGS. 19 and 20, a situation can arise that involves migration of some or all applications from a previous version of an operating system to a later one. For example, given MS Windows XP, a user can have a number of applications that run only under Windows XP, and require running a newer version of the OS (e.g., Vista or Windows 7) in legacy mode. Other applications may be compatible with the newer OS version, and can run natively. Other applications can run in the emulated legacy mode of the OS (e.g., XPM in Windows 7)—although some legacy applications are not compatible with it. The proposed system can automatically migrate the applications to the new OS, automatically associate the migrated applications with the new OS, attempt to launch them, and, upon failure, automatically invoke a different VM with which that application is compatible (e.g., Windows XP as the guest OS in this example). As an alternative, an isolated virtual environment using hardware virtualization techniques (VT-x, VT-d, etc.) can be launched, in order to run the legacy applications that are incompatible with the new OS.

As a further option, a container, such as available from Parallels Software International, Inc., can be used as an isolation environment. Other virtualization environments, such as those available from Microsoft Corp. can also be used. As a further option, for example, to increase efficiency, some migrated applications can be launched in an isolated environment or in a VM, even if they can run natively. In some cases, where only minor incompatibilities exist (such as driver settings, registry hive migration, etc.), the legacy application can still be launched in the new OS (with the appropriate settings). Other settings, such as parental control settings, can also be migrated (or maintained with the application, such as, for example, a browser). Thus, the process of migration from legacy OS to a new OS is essentially transparent to the user, who only sees an integrated desktop and applications as the end result. The migration can be performed as described, for example, in U.S. patent application Ser. No. 12/050,409, filed on Mar. 18, 2008.

Note that the incompatibility in the applications can be due to migration to a newer version of an OS, to an older version, due to a different OS altogether, or due to hardware issues (for example, when migrating from one computer to another, or to a platform with different capabilities, or to a platform that does not have the required hardware capabilities for a particular application, and therefore requires emulation).

Additionally, hibernation and VM restart techniques, such as described in U.S. patent application Ser. No. 12/048,046, filed on Mar. 13, 2008, incorporated herein by reference, can also be used to implement seamless migration and upgrade to another OS. Also, techniques described in U.S. patent application Ser. No. 12/131,889, filed on 2 Jun. 2008, incorporated herein by reference, can be used to control multiple VMs, physical computers and isolated environments described herein.

The migration procedure can be based on criteria defined by migration vendor, by OS vendor, by application vendor, or "on the fly" during migration attempt. The applications to be migrated are chosen by a user, or the migration is performed automatically, and, upon failure of migration, the application in question is started in a VM or an isolated environment. Thus, there are several possible migration paths for legacy applications: (1) from old to new "as is", (2) from old to new "with upgrade", (3)—from old to new "into a container (e.g., Parallels®, Microsoft®, Softgrid®, etc.) with significantly different settings of the new OS", and (4) from old to new "into VM with old OS".

Figure 8:
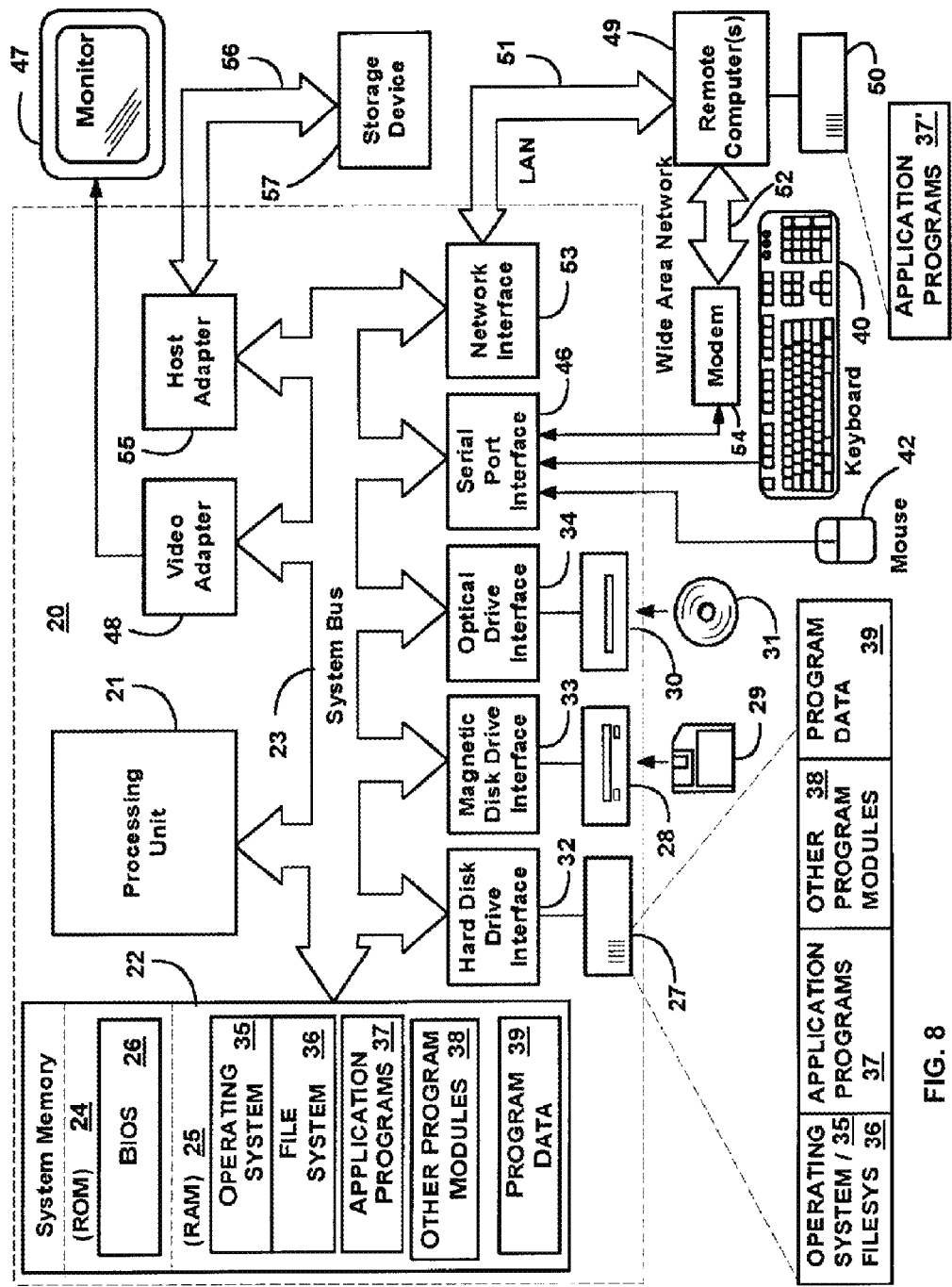
FIG. 8 illustrates an exemplary computer system on which the invention may be implemented.

With reference to FIG. 8, an exemplary system for implementing the invention includes a general purpose computing device in the form of a personal computer or server 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (preferably Windows™ 2000). The computer 20 includes a file system 36 associated with or included within the operating system 35, such as the Windows NT™ File System (NTFS), one or more application programs 37, other program modules 38 and program data 39. A user may enter commands and information into the personal computer 20 through input devices such as a keyboard 40 and pointing device 42. Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote computers 49. The remote computer (or computers) 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Having thus described a preferred embodiment, it should be apparent to those skilled in the art that certain advantages of the described method and apparatus have been achieved. It should also be appreciated that various modifications, adaptations, and alternative embodiments thereof may be made within the scope and spirit of the present invention. The invention is further defined by the following claims.

What is claimed is:

1. A method for managing non-native applications on a computer having a processor and a memory, the method comprising:

launching a first Virtual Machine (VM) and a first guest operating system (OS) in the VM, on a computing system that has a host OS and a host desktop, wherein the first VM has a non-native application associated with the first guest OS;

replacing the first guest OS in the first VM with a different guest OS;

upon a user attempting to launch the non-native application, associating the non-native application in the first VM with a second VM;

launching the second VM and a second guest OS in the second VM;

determining compatibility of the non-native application with the second guest OS; and launching the non-native application inside the second VM.

2. The method of claim 1, further comprising configuring the non-native application for compatibility with the second VM.

3. The method of claim 2, wherein the configuring step includes modifying registry settings.

4. The method of claim 2, wherein the configuring step includes modifying driver settings.

5. The method of claim 2, wherein the configuring step includes setting up an emulation environment of required hardware.

6. The method of claim 1, wherein the second guest OS is the same version of the operating system as the first guest OS.

7. The method of claim 1, wherein the different guest OS is a later version of the first guest OS.

8. A non-transitory computer-useable storage medium having computer code stored thereon for implementing the steps of claim 1.

9. A system for managing non-native applications comprising:
a processor;
a memory coupled to the processor;
computer code loaded into the memory for implementing the following:
a first Virtual Machine (VM) and a first guest OS in the VM, on a computing system that has a host OS and a host desktop, wherein the first VM has a non-native application associated with the first VM and the first guest OS;
means for replacing the first guest OS in the first VM with a different guest OS;
a second VM and a second guest OS in the second VM running on the processor;
upon a user attempting to launch the non-native application, means for associating the non-native application with the second VM; and
means for determining compatibility of the non-native application with the second guest OS;
wherein the non-native application is launched inside the second VM.

10. The system of claim 9, wherein the non-native application is automatically configured for compatibility with the second VM.

11. The system of claim 10, wherein the configuring includes modifying registry settings.

12. The system of claim 10, wherein the configuring includes modifying driver settings.

13. The system of claim 10, wherein the configuring includes setting up an emulation environment of required hardware.

14. The system of claim 9, wherein the second guest OS is the same version of the operating system as the first guest OS.

15. The system of claim 9, wherein the different guest OS is a later version of the first guest OS.

16. A method for managing non-native applications on a computer having a processor and a memory, the method comprising:
downloading an executable file into a first Virtual Machine (VM) having a first guest operating system (OS), on a computing system that has a host OS and a host desktop,
determining that a non-native application corresponding to the executable file is incompatible with the first guest OS of the first VM;
upon a user attempting to launch the non-native application, associating the non-native application in the first VM with a second VM;
launching the second VM and a second guest OS in the second VM;
determining compatibility of the non-native application with the second guest OS; and
launching the non-native application inside the second VM.

17. A non-transitory computer-useable storage medium containing code for performing the steps of claim 16.

18. A method for managing non-native applications on a computer having a processor and a memory, the method comprising:
launching a Virtual Machine (VM) and a guest operating system (OS) in the VM, on a computing system that has a host OS and a host desktop,
wherein the VM has a non-native browser associated with the first guest OS;
upon a user attempting to launch the non-native browser, launching a native browser under the host OS and copying objects displayed in the non-native browser in the VM to the native browser;
displaying the objects from the non-native browser in the native browser such that a native look-and-feel of the native browser is preserved,
wherein a switch from the non-native browser to the native browser appears seamless to the user.

19. A system for managing non-native applications on a computer having a processor and a memory, the system comprising:
a processor;
a memory coupled to the processor;
computer code loaded into the memory for implementing the following:
launching a Virtual Machine (VM) and a guest operating system (OS) in the VM, on a computing system that has a host OS and a host desktop,
wherein the VM has a non-native browser associated with the first guest OS;
upon a user attempting to launch the non-native browser, launching a native browser under the host OS and copying objects displayed in the non-native browser in the VM to the native browser;
displaying the objects from the non-native browser in the native browser such that a native look-and-feel of the native browser is preserved,
wherein a switch from the non-native browser to the native browser appears seamless to the user.

* * * * *